United States Patent
Mizuno et al.

(10) Patent No.: US 8,349,124 B2
(45) Date of Patent: Jan. 8, 2013

(54) SEALING MATERIAL FOR HONEYCOMB STRUCTURE, HONEYCOMB STRUCTURE AND METHOD FOR MANUFACTURING HONEYCOMB STRUCTURE

(75) Inventors: Hideaki Mizuno, Ibi-gun (JP); Akikazu Miyata, Ibi-gun (JP); Yosuke Fuchi, Ibi-gun (JP)

(73) Assignee: Ibiden Co., Ltd., Ogaki-Shi (JP)

( * ) Notice: Subject to any disclaimer, the term of this patent is extended or adjusted under 35 U.S.C. 154(b) by 935 days.

(21) Appl. No.: 12/334,226

(22) Filed: Dec. 12, 2008

(65) Prior Publication Data
US 2009/0220735 A1   Sep. 3, 2009

(30) Foreign Application Priority Data

Feb. 29, 2008 (WO) .................. PCT/JP2008/053638

(51) Int. Cl.
*C04B 37/00* (2006.01)
*C04B 33/34* (2006.01)
*B29C 65/00* (2006.01)
*C03B 29/00* (2006.01)
*C09J 5/00* (2006.01)

(52) U.S. Cl. .................. 156/325; 156/89.22; 156/89.11; 156/60; 156/153; 156/278; 156/279; 156/305

(58) Field of Classification Search ............... 156/89.11, 156/89.22, 60, 153, 278, 279, 305, 325
See application file for complete search history.

(56) References Cited

U.S. PATENT DOCUMENTS

| | | | | |
|---|---|---|---|---|
| 5,346,722 | A * | 9/1994 | Beauseigneur et al. | 427/300 |
| 5,609,998 | A * | 3/1997 | Texter et al. | 430/449 |
| 5,914,187 | A | 6/1999 | Naruse et al. | |
| 6,669,751 | B1 | 12/2003 | Ohno et al. | |
| 7,112,233 | B2 | 9/2006 | Ohno et al. | |
| 7,284,980 | B2 | 10/2007 | Saijo et al. | |
| 7,309,370 | B2 | 12/2007 | Kudo et al. | |
| 7,332,014 | B2 | 2/2008 | Ono et al. | |
| 7,341,614 | B2 | 3/2008 | Hayashi et al. | |
| 7,348,049 | B2 | 3/2008 | Yoshida | |
| 7,387,829 | B2 | 6/2008 | Ohno et al. | |
| 7,393,376 | B2 | 7/2008 | Taoka et al. | |
| 7,396,586 | B2 | 7/2008 | Ohno et al. | |

(Continued)

FOREIGN PATENT DOCUMENTS
EP  1698604  9/2006
(Continued)

OTHER PUBLICATIONS

Shabanova et al. XP002504165 "Aggregation Stability of Silica Sol—Polystyrene Latex Mixtures", Colloid Journal vol. 63, No. 5, 2001, pp. 649-652.

(Continued)

*Primary Examiner* — Philip Tucker
*Assistant Examiner* — Alex Efta
(74) *Attorney, Agent, or Firm* — Ditthavong Mori & Steiner, P.C.

(57) ABSTRACT

A sealing material for a honeycomb structure includes inorganic fibers, oxide sol, and inorganic particles. The inorganic fibers include at least one of an alkali metal compound, an alkaline earth metal compound and a boron compound. The sealing material has a pH of at least about 4 and at most about 6.

32 Claims, 12 Drawing Sheets

U.S. PATENT DOCUMENTS

| | | |
|---|---|---|
| 7,427,308 B2 | 9/2008 | Taoka et al. |
| 7,427,309 B2 | 9/2008 | Ohno et al. |
| 7,438,967 B2 | 10/2008 | Fujita |
| 7,449,427 B2 | 11/2008 | Ohno et al. |
| 7,462,216 B2 | 12/2008 | Kunieda et al. |
| 7,473,465 B2 | 1/2009 | Ohno et al. |
| 7,491,057 B2 | 2/2009 | Saijo et al. |
| 7,498,544 B2 | 3/2009 | Saijo et al. |
| 7,504,359 B2 | 3/2009 | Ogyu et al. |
| 7,520,178 B2 | 4/2009 | Ohno et al. |
| 7,524,350 B2 | 4/2009 | Kunieda |
| 7,540,898 B2 | 6/2009 | Oshimi |
| 7,543,513 B2 | 6/2009 | Kobayashi et al. |
| 7,550,026 B2 | 6/2009 | Hayakawa |
| 7,556,666 B2 | 7/2009 | Kunieda |
| 2002/0061812 A1 | 5/2002 | Yamazaki et al. |
| 2004/0161596 A1 | 8/2004 | Taoka et al. |
| 2005/0109023 A1 | 5/2005 | Kudo et al. |
| 2005/0153099 A1 | 7/2005 | Yamada |
| 2005/0169819 A1 | 8/2005 | Shibata |
| 2005/0175514 A1 | 8/2005 | Ohno |
| 2005/0180898 A1 | 8/2005 | Yamada |
| 2005/0227058 A1* | 10/2005 | Ohashi et al. ............... 428/292.1 |
| 2005/0247038 A1 | 11/2005 | Takahashi |
| 2005/0272602 A1 | 12/2005 | Ninomiya |
| 2006/0021310 A1 | 2/2006 | Ohno et al. |
| 2006/0029898 A1 | 2/2006 | Saijo et al. |
| 2006/0043652 A1 | 3/2006 | Saijo et al. |
| 2006/0051556 A1 | 3/2006 | Ohno et al. |
| 2006/0073970 A1 | 4/2006 | Yamada |
| 2006/0108347 A1 | 5/2006 | Koyama et al. |
| 2006/0118546 A1 | 6/2006 | Saijo |
| 2006/0210765 A1 | 9/2006 | Ohno et al. |
| 2006/0216466 A1 | 9/2006 | Yoshida |
| 2006/0216467 A1 | 9/2006 | Yoshida |
| 2006/0222812 A1 | 10/2006 | Koyama et al. |
| 2006/0225390 A1 | 10/2006 | Yoshida |
| 2006/0269722 A1 | 11/2006 | Yamada |
| 2006/0292331 A1* | 12/2006 | Ohno et al. ................... 428/116 |
| 2007/0020155 A1 | 1/2007 | Ohno et al. |
| 2007/0028575 A1 | 2/2007 | Ohno et al. |
| 2007/0068128 A1 | 3/2007 | Oshimi et al. |
| 2007/0085233 A1 | 4/2007 | Yamada |
| 2007/0116908 A1 | 5/2007 | Ohno et al. |
| 2007/0126160 A1 | 6/2007 | Takahashi |
| 2007/0128405 A1 | 6/2007 | Sakaguchi et al. |
| 2007/0130897 A1 | 6/2007 | Sakaguchi et al. |
| 2007/0144561 A1 | 6/2007 | Saijo et al. |
| 2007/0148403 A1 | 6/2007 | Yamamura et al. |
| 2007/0152382 A1 | 7/2007 | Yamada et al. |
| 2007/0175060 A1 | 8/2007 | Idei et al. |
| 2007/0178275 A1 | 8/2007 | Takahashi |
| 2007/0187651 A1 | 8/2007 | Naruse et al. |
| 2007/0190350 A1 | 8/2007 | Ohno et al. |
| 2007/0196620 A1 | 8/2007 | Ohno et al. |
| 2007/0199205 A1 | 8/2007 | Hoshino et al. |
| 2007/0199643 A1 | 8/2007 | Kawai et al. |
| 2007/0204580 A1* | 9/2007 | Kunieda ........................ 55/523 |
| 2007/0212517 A1 | 9/2007 | Ohno et al. |
| 2007/0235895 A1 | 10/2007 | Yamamura et al. |
| 2007/0243283 A1 | 10/2007 | Yamamura et al. |
| 2007/0262497 A1 | 11/2007 | Yamamura et al. |
| 2007/0262498 A1 | 11/2007 | Saijo et al. |
| 2007/0277655 A1 | 12/2007 | Kawai et al. |
| 2007/0293392 A1 | 12/2007 | Ohno et al. |
| 2008/0006971 A1 | 1/2008 | Kawai et al. |
| 2008/0067725 A1 | 3/2008 | Naruse et al. |
| 2008/0084010 A1 | 4/2008 | Naruse et al. |
| 2008/0088072 A1 | 4/2008 | Kobayashi |
| 2008/0106008 A1 | 5/2008 | Kasai et al. |
| 2008/0106009 A1 | 5/2008 | Naruse et al. |
| 2008/0111274 A1 | 5/2008 | Kawai et al. |
| 2008/0116200 A1 | 5/2008 | Kawai et al. |
| 2008/0116601 A1 | 5/2008 | Naruse et al. |
| 2008/0120950 A1 | 5/2008 | Ohno et al. |
| 2008/0136053 A1 | 6/2008 | Kuribayashi et al. |
| 2008/0136062 A1 | 6/2008 | Kasai et al. |
| 2008/0138567 A1 | 6/2008 | Ninomiya et al. |
| 2008/0150200 A1 | 6/2008 | Tajima |
| 2008/0157445 A1 | 7/2008 | Kawai et al. |
| 2008/0160249 A1 | 7/2008 | Makino |
| 2008/0174039 A1 | 7/2008 | Saijo et al. |
| 2008/0179781 A1 | 7/2008 | Iwata |
| 2008/0190081 A1 | 8/2008 | Oshimi |
| 2008/0190083 A1 | 8/2008 | Oshimi |
| 2008/0197544 A1 | 8/2008 | Saijo et al. |
| 2008/0211127 A1 | 9/2008 | Naruse et al. |
| 2008/0213485 A1 | 9/2008 | Shibata |
| 2008/0236115 A1 | 10/2008 | Sakashita |
| 2008/0236122 A1 | 10/2008 | Ito |
| 2008/0236724 A1 | 10/2008 | Higuchi |
| 2008/0237942 A1 | 10/2008 | Takamatsu |
| 2008/0241015 A1 | 10/2008 | Kudo et al. |
| 2008/0241444 A1 | 10/2008 | Oshimi |
| 2008/0241466 A1 | 10/2008 | Saito et al. |
| 2008/0242535 A1* | 10/2008 | Liu et al. ...................... 502/232 |
| 2008/0251977 A1 | 10/2008 | Naruse et al. |
| 2008/0284067 A1 | 11/2008 | Naruse et al. |
| 2008/0286523 A1* | 11/2008 | Ohno et al. ................... 428/116 |
| 2008/0305259 A1 | 12/2008 | Saijo |
| 2008/0318001 A1 | 12/2008 | Sakakibara |
| 2009/0004431 A1 | 1/2009 | Ninomiya |
| 2009/0011178 A1* | 1/2009 | Masukawa et al. ........... 428/116 |
| 2009/0079111 A1 | 3/2009 | Kasai et al. |
| 2009/0107879 A1 | 4/2009 | Otsuka et al. |
| 2009/0130378 A1 | 5/2009 | Imaeda et al. |

FOREIGN PATENT DOCUMENTS

| | | |
|---|---|---|
| EP | 1743685 | 1/2007 |
| EP | 1930058 | 6/2008 |
| JP | 7-010650 | 1/1995 |
| JP | 2002-095964 | 4/2002 |
| JP | 2007-534483 | 11/2007 |
| KR | 2006-56277 | 5/2006 |
| WO | WO 2005/047210 | 5/2005 |
| WO | WO 2005/110578 | 11/2005 |
| WO | WO 2005/113126 | 12/2005 |
| WO | WO 2007119407 A1 * | 10/2007 |

OTHER PUBLICATIONS

Korean Office Action for corresponding KR Application No. 10-2008-0127732, Jan. 14, 2011.

* cited by examiner

A-A line cross-sectional view

SEALING MATERIAL FOR HONEYCOMB STRUCTURE, HONEYCOMB STRUCTURE AND METHOD FOR MANUFACTURING HONEYCOMB STRUCTURE

CROSS-REFERENCE TO RELATED APPLICATIONS

The present application claims priority under 35 U.S.C. §119 to PCT Application No. PCT/JP2008/053638, filed Feb. 29, 2008, the contents of which are incorporated herein by reference in their entirety.

BACKGROUND OF THE INVENTION

1. Field of the Invention

The present invention relates to a sealing material for a honeycomb structure, a honeycomb structure and a method for manufacturing a honeycomb structure.

2. Discussion of the Background

In a honeycomb structure used as a filter for removing particulates and the like from exhaust gases discharged from an internal combustion engine such as a diesel engine, or as a catalyst supporting carrier for removing toxic components such as HC and CO from the exhaust gases, inorganic fibers have been used as materials for various constituent members.

Specific examples thereof includes a sealing material containing inorganic fibers such as a sealing material (adhesive) for combining a plurality of honeycomb fired bodies to form a ceramic block and a sealing material (peripheral sealing material) to be formed on the periphery of a ceramic block.

In the case when such inorganic fibers remain in the human body, in particular, in lungs or the like, they might be harmful to the human body. Therefore, the inorganic fibers used in the sealing material are desirably highly safe to the human body.

WO 05/110578 A1 has described a sealing material containing, as inorganic fibers, at least one kind selected from the group consisting of an alkali metal compound, an alkaline earth metal compound and a boron compound.

The compounds included in the inorganic fibers, described in WO 05/110578 A1, are so-called biosoluble fibers. The biosoluble fibers are soluble in physiological saline solution. Therefore, even when taken into the human body, the biosoluble fibers are dissolved and discharged out of the body, and are subsequently considered to be highly safe to the human body.

The contents of WO 05/110578 A1 are incorporated herein by reference in their entirety.

SUMMARY OF THE INVENTION

According to one aspect of the present invention, a sealing material for a honeycomb structure includes inorganic fibers, oxide sol, and inorganic particles. The inorganic fibers include at least one of an alkali metal compound, an alkaline earth metal compound and a boron compound. The sealing material has a pH of at least about 4 and at most about 6.

According to another aspect of the present invention, a honeycomb structure includes a ceramic block and a peripheral sealing material layer. The ceramic block includes at least one honeycomb fired body having a longitudinal direction and a plurality of cell walls extending along the longitudinal direction to define a plurality of cells. The peripheral sealing material layer is provided on a peripheral face of the ceramic block by drying and solidifying a sealing material. The sealing material includes inorganic fibers, oxide sol, and inorganic particles. The inorganic fibers include at least one of an alkali metal compound, an alkaline earth metal compound and a boron compound. The sealing material has a pH of at least about 4 and at most about 6.

According to further aspect of the present invention, a method for manufacturing a honeycomb structure includes preparing a sealing material which includes inorganic fibers, oxide sol and inorganic particles. The inorganic fibers include at least one of an alkali metal compound, an alkaline earth metal compound and a boron compound. The sealing material has a pH of at least about 4 and at most about 6. The honeycomb structure includes a ceramic block. A periphery sealing material paste layer including the sealing material is provided on a peripheral face of the ceramic block. The sealing material is dried and solidified to provide a peripheral sealing material layer.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

Figure 1:
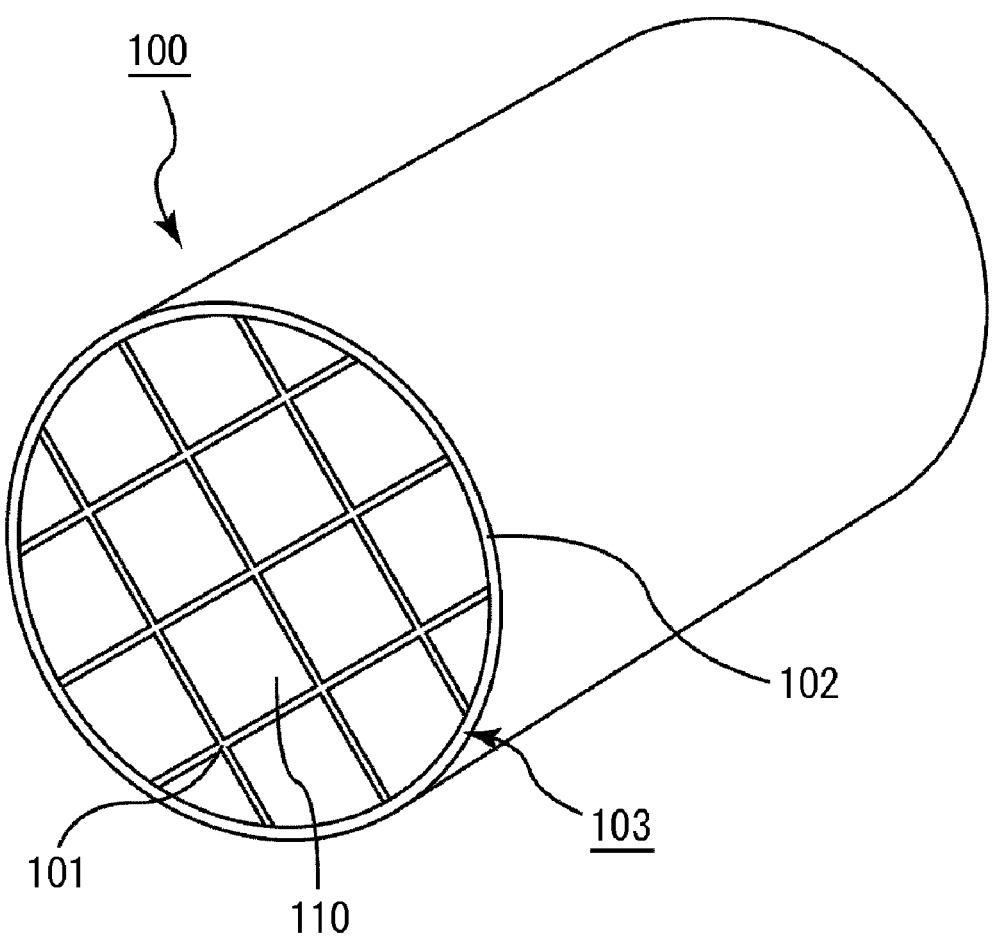
FIG. 1 is a perspective view that schematically shows one example of a honeycomb structure according to one embodiment of the present invention.

Embodiments will now be described with reference to the accompanying drawings, wherein like reference numerals designate corresponding or identical elements throughout the various drawings.

The sealing material described in WO 05/110578 A1 is prepared in the form of a paste by mixing an inorganic binder, an organic binder, inorganic particles, water and the like with the inorganic fibers, because the sealing material is applied to a ceramic block or a honeycomb fired body when used.

However, when the sealing material is prepared by using the biosoluble fibers as the inorganic fibers, and an oxide sol as the inorganic binder, aggregation or gelation tends to occur in the sealing material as the time elapses after preparation of the sealing material, leading to low flowability and a high viscosity of the paste.

When a phenomenon such as aggregation or gelation occurs in the sealing material, a problem arises in which applying of the sealing material to the ceramic block or the like becomes difficult.

The inventors of the present invention have intensively examined causes for aggregation or gelation in the sealing material. As a result, the inventors have found that, when the paste is alkaline, in particular, has a pH exceeding about 6, gelation in the sealing material tends to occur due to gelation of the oxide sol.

Here, in the present description, the term "gelation" refers to a phenomenon of aggregation of solid components dispersed in a sol, which is caused by a change in the pH or the like and causes an increase in the viscosity.

Normally, electrical double layers are formed on the surfaces of the inorganic particles and the oxide sol contained in the sealing material. The electrical double layers are considered to allow the inorganic particles and the oxide sol to stably exist dispersed.

However, when the pH exceeds about 6, polyvalent metal ions ($Ca^{2+}$, $Mg^{2+}$) contained in the biosoluble fibers elute and interfere with the surface charge of the oxide sol. Therefore, the charge balance on the surface of the oxide sol is disturbed, leading to aggregation of the oxide sol. This is presumably the reason why gelation occurs in the sealing material.

The pH of the paste is considered to give influences to the reaction rate between the polyvalent metal ions and the oxide sol. Under high pH conditions, the reaction rate is faster so that gelation of the sealing material easily progresses.

Moreover, the inventors of the present invention have also found that, when the paste is acidic, in particular, has a pH of less than about 4, the inorganic particles in the paste tend to aggregate.

Based upon the examination results, the inventors of the present invention have found that it may become easier to provide a sealing material for a honeycomb structure having coating properties to the ceramic block or the like even a long time after preparation of the paste by controlling the pH of the sealing material for a honeycomb structure in a suitable range, and consequently have completed the present invention.

Namely, the sealing material for a honeycomb structure according to embodiments of the present invention includes inorganic fibers, oxide sol and inorganic particles, wherein the inorganic fibers include at least one kind selected from the group consisting of an alkali metal compound, an alkaline earth metal compound and a boron compound, and a pH of the sealing material for a honeycomb structure is at least about 4 and at most about 6.

The inorganic fibers contained in the sealing material for a honeycomb structure according to the embodiments of the present invention includes at least one kind selected from the group consisting of an alkali metal compound, an alkaline earth metal compound and a boron compound. Since these compounds are so-called biosoluble fibers, it may become easier to provide a sealing material for a honeycomb structure that is highly safe to the human body.

Moreover, since the pH of the sealing material for a honeycomb structure is about 4 or more, inorganic particles tend not to aggregate after preparation of the paste. Moreover, since the pH of the sealing material for a honeycomb structure is about 6 or less, the sealing material tends not to gelate after preparation of the paste.

For these reasons, it may become easier to prevent a deterioration in the flowability of the paste and an increase in the viscosity thereof even a long time after preparation of the paste.

Therefore, it may become easier to provide a sealing material for a honeycomb structure that is has superior coating properties to the ceramic block or the like even a long time after preparation of the paste.

In the sealing material for a honeycomb structure according to the embodiments of the present invention, an acidic solution is mixed with an alkaline mixture containing an alkaline oxide sol as the oxide sol, the inorganic fibers and the inorganic particles.

In the sealing material for a honeycomb structure according to the embodiments of the present invention, a pH of the acidic solution is at least about 1 and at most about 3.

In the sealing material for a honeycomb structure according to the embodiments of the present invention, the acidic solution is a lactic acid aqueous solution.

In the sealing material for a honeycomb structure according to the embodiments of the present invention, an average particle diameter of the oxide sol is at least about 5 nm and at most about 30 nm.

By using the oxide sol having an average particle diameter of at least about 5 nm and at most about 30 nm, when a peripheral sealing material layer is formed on the peripheral face of the ceramic block by using the sealing material for a honeycomb fired body, it may become easier to increase the adhesive strength between the ceramic block and the peripheral sealing material layer.

Moreover, by using the oxide sol having an average particle diameter of at least about 5 nm and at most about 30 nm, when the sealing material for a honeycomb structure is used as an adhesive for bonding honeycomb fired bodies to one another, it may become easier to increase the adhesive strength between the honeycomb fired bodies.

In the sealing material for a honeycomb structure according to the embodiments of the present invention, the oxide sol is silica sol.

Namely, the honeycomb structure according to embodiments of the present invention includes a ceramic block including one or a plurality of honeycomb fired bodies each having a large number of cells longitudinally placed in parallel with one another with a cell wall interposed therebetween; and a peripheral sealing material layer formed on a peripheral face of the ceramic block, wherein the peripheral sealing material layer is formed by drying and solidifying a sealing material for a honeycomb structure containing inorganic fibers, oxide sol and inorganic particles and having a pH of at least about 4 and at most about 6, the inorganic fibers selected from the group consisting of an alkali metal compound, an alkaline earth metal compound and a boron compound.

The inorganic fibers contained in the sealing material for a honeycomb structure according to the embodiments of the present invention includes at least one kind selected from the group consisting of an alkali metal compound, an alkaline earth metal compound and a boron compound, and the inorganic fibers including the above-mentioned compound are also contained in the peripheral sealing material layer. Since these compounds are so-called biosoluble fibers, it may become easier to manufacture a honeycomb structure that is highly safe to the human body.

In the honeycomb structure according to the embodiments of the present invention, the ceramic block includes the plurality of the honeycomb fired bodies and an adhesive layer formed between side faces of the honeycomb fired bodies.

In the honeycomb structure according to the embodiments of the present invention, the adhesive layer is formed by drying and solidifying the sealing material for a honeycomb structure.

Since the inorganic fibers contained in the adhesive layer are biosoluble fibers, it may become easier to provide a honeycomb structure that is highly safe to the human body and includes the plurality of the honeycomb fired bodies combined with one another with the adhesive layer interposed therebetween.

In the honeycomb structure according to the embodiments of the present invention, the sealing material for a honeycomb structure is formed by mixing an acidic solution with an alkaline mixture containing an alkaline oxide sol as the oxide sol, the inorganic fibers and the inorganic particles.

In the honeycomb structure according to the embodiments of the present invention, a pH of the acidic solution is at least about 1 and at most about 3.

In the honeycomb structure according to the embodiments of the present invention, the acidic solution is a lactic acid aqueous solution.

In the honeycomb structure according to the embodiments of the present invention, an average particle diameter of the oxide sol is at least about 5 nm and at most about 30 nm.

When the average particle diameter of the oxide sol in the sealing material for a honeycomb structure is at least about 5 nm and at most about 30 nm, it may become easier to increase the adhesive strength between the ceramic block and the peripheral sealing material layer.

Moreover, when the ceramic block includes a plurality of the honeycomb fired bodies and the adhesive layer formed between the honeycomb fired bodies, and the adhesive layer is formed by drying and solidifying the sealing material for a honeycomb structure, by using the oxide sol having an average particle diameter of at least about 5 nm and at most about 30 nm, it may become easier to increase the adhesive strength between the honeycomb fired bodies.

In the honeycomb structure according to the embodiments of the present invention, the oxide sol is silica sol.

The method for manufacturing a honeycomb structure according to embodiments of the present invention is a method for manufacturing a honeycomb structure, the honeycomb structure including: a ceramic block including one or a plurality of honeycomb fired bodies each having a large number of cells longitudinally placed in parallel with one another with a cell wall interposed therebetween; and a peripheral sealing material layer formed on a peripheral face of the ceramic block, the method including: preparing a sealing material for a honeycomb structure containing inorganic fibers, oxide sol and inorganic particles and having a pH of at least about 4 and at most about 6, the inorganic fibers selected from the group consisting of an alkali metal compound, an alkaline earth metal compound and a boron compound; and forming a peripheral sealing material layer by forming a periphery sealing material paste layer including the sealing material for a honeycomb structure on a peripheral face of the ceramic block and drying and solidifying the sealing material for a honeycomb structure.

In the method for manufacturing a honeycomb structure according to the embodiments of the present invention, since the sealing material for a honeycomb structure to be prepared in the preparing a sealing material for a honeycomb structure has a pH of about 4 or more, inorganic particles tend not to aggregate after preparation of the paste. Moreover, since the pH of the sealing material for a honeycomb structure is about 6 or less, the sealing material tends not to galete after preparation of the paste.

For these reasons, even a long time after preparation of the paste, it may become easier to prevent a deterioration in the flowability of the paste and an increase in the viscosity thereof. Thus, the operability when forming a peripheral sealing material paste layer on the peripheral face of the ceramic block in the forming a peripheral sealing material layer tends to be improved.

Moreover, it may become easier to form a peripheral sealing material layer containing inorganic fibers including at least one kind selected from the group consisting of an alkali metal compound, an alkaline earth metal compound and a boron compound. Since these compounds are so-called biosoluble fibers, it may become easier to manufacture a honeycomb structure that is highly safe to the human body.

In the method for manufacturing a honeycomb structure according to the embodiments of the present invention, the forming a peripheral sealing material layer includes forming the peripheral sealing material paste layer by applying the sealing material for a honeycomb structure to the peripheral face of the ceramic block.

The method for manufacturing a honeycomb structure according to the embodiments of the present invention further includes: combining the plurality of the honeycomb fired bodies by applying an adhesive to side faces of the plurality of the honeycomb fired bodies, laminating the plurality of the honeycomb fired bodies, and then bonding the plurality of the honeycomb fired bodies by interposing an adhesive layer formed by drying and solidifying the adhesive; or combining the plurality of the honeycomb fired bodies by arranging the plurality of the honeycomb fired bodies with a predetermined sized gap maintained therebetween, filling the gap with an adhesive, and then bonding the plurality of the honeycomb fired bodies by interposing an adhesive layer formed by drying and solidifying the adhesive.

In the method for manufacturing a honeycomb structure according to the embodiments of the present invention, the sealing material for a honeycomb structure is used as the adhesive.

By using the sealing material for a honeycomb structure as an adhesive, it may become easier to prevent a deterioration in the flowability of the sealing material for a honeycomb structure and an increase in the viscosity thereof.

For this reason, the operability when applying the adhesive to side faces of each honeycomb fired body and the operability when filling with the adhesive a gap formed between the honeycomb fired bodies tends to be improved.

Moreover, it may become easier to form an adhesive layer containing inorganic fibers including at least one kind of compound selected from the group consisting of an alkali metal compound, an alkaline earth metal compound and a boron compound. Since these compounds are so-called biosoluble fibers, it may become easier to manufacture a honeycomb structure that is highly safe to the human body.

The method for manufacturing a honeycomb structure according to the embodiments of the present invention further includes: placing the plurality of the honeycomb fired bodies in a tubiform with a predetermined sized gap being maintained between the honeycomb fired bodies and a predetermined sized gap being maintained between the honeycomb fired bodies and the tubiform; filling with the sealing material for a honeycomb structure the gap formed between the honeycomb fired bodies and the gap formed between the honeycomb fired bodies and the tubiform; and forming an adhesive layer between the honeycomb fired bodies and the peripheral sealing material layer by drying and solidifying the sealing material for a honeycomb structure.

By using this method, it may become easier to simultaneously and easily form the adhesive layer between the honeycomb fired bodies and the peripheral sealing material layer.

In the method for manufacturing a honeycomb structure according to the embodiments of the present invention, the preparing a sealing material for a honeycomb structure includes mixing an acidic solution with an alkaline mixture containing an alkaline oxide sol as the oxide sol, the inorganic fibers and the inorganic particles.

In the method for manufacturing a honeycomb structure according to the embodiments of the present invention, a pH of the acidic solution is at least about 1 and at most about 3. In the method for manufacturing a honeycomb structure according to the embodiments of the present invention, the acidic solution is a lactic acid aqueous solution.

In order to adjust the pH of the sealing material for a honeycomb structure in a range of at least about 4 and at most about 6, when a solution prior to adjusting the pH has a low pH, in particular, a pH of less than about 4, the pH of the sealing material needs to be adjusted by using an alkaline solution. However, from the viewpoint of safety during the operation, it considered preferable to avoid the use of the alkaline solution.

When an acidic solution is mixed with the alkaline mixture to prepare the sealing material for a honeycomb structure as described in the method for manufacturing a honeycomb structure according to the embodiments of the present invention, it is possible to easily control the pH of the sealing material in a range of at least about 4 and at most about 6 without using an alkaline solution.

Moreover, when a lactic acid solution is used as the acidic solution, it may become easier to further enhance the safety during the operation in the preparing a sealing material for a honeycomb structure.

In the method for manufacturing a honeycomb structure according to the embodiments of the present invention, an average particle size of the oxide sol is at least about 5 nm and at most about 30 nm.

When the average particle diameter of the oxide sol in the sealing material for a honeycomb structure is at least about 5 nm and at most about 30 nm, it may become easier to form a sealing material layer having a high adhesive strength between the ceramic block and the peripheral sealing material layer.

Moreover, when forming an adhesive layer between the honeycomb fired bodies, by using the oxide sol having an average particle diameter of at least about 5 nm and at most about 30 nm in the sealing material for a honeycomb structure, it may become easier to form an adhesive layer having a high adhesive strength between the honeycomb fired bodies.

In the method for manufacturing a honeycomb structure according to the embodiments of the present invention, the oxide sol is silica sol.

The embodiments of the present invention tend to provide a sealing material for a honeycomb structure containing well biosoluble inorganic fibers and having superior coating properties to a ceramic block or the like even a long time after preparation of the paste.

Moreover, the embodiments of the present invention tend to provide a honeycomb structure manufactured by using the above-mentioned sealing material for a honeycomb structure and also to provide a method for manufacturing such the above-mentioned honeycomb structure.

First Embodiment

Hereinafter, the sealing material for a honeycomb structure, the honeycomb structure and the method for manufacturing a honeycomb structure according to the embodiments of the present invention will be described with reference to the figures.

First, the sealing material for a honeycomb structure according to the embodiments of the present invention will be described.

A sealing material for a honeycomb structure of the present embodiment includes inorganic fibers, oxide sol and inorganic particles.

The above-mentioned inorganic fibers include at least one kind selected from the group consisting of an alkali metal compound, an alkaline earth metal compound and a boron compound.

Examples of the above-mentioned alkali metal compound include sodium oxide, potassium oxide and the like. Examples of the above-mentioned alkaline earth metal compound include magnesium oxide, calcium oxide, barium oxide and the like. Examples of the above-mentioned boron compound include boron oxide and the like.

Moreover, the lower limit of the content of the inorganic fibers contained in the sealing material for a honeycomb structure is desirably about 10% by weight, more desirably about 20% by weight as solids content. The upper limit thereof is desirably about 70% by weight, more desirably about 40% by weight, further more desirably about 30% by weight as solids content. The content of the inorganic fibers of about 10% or more by weight tends not to cause a deterioration in the elasticity. On the contrary, the content of the inorganic fibers of about 70% or less by weight tends not to cause a decrease in the adhesive strength as well in the thermal conductivity.

Moreover, the lower limit of the fiber length is desirably about 0.1 μm and the upper limit thereof is desirably about 1000 μm, more desirably about 100 μm, further more desirably about 50 μm.

The fiber length of about 0.1 μm or more makes it easier to manufacture a honeycomb structure having sufficient elasticity. The fiber length of about 1000 μm or less tends not to cause the inorganic fiber to pill in the form of fibers, making it easier to form a thin adhesive layer or a thin peripheral sealing material layer, and also tends not to cause poor dispersal of the inorganic particles.

Moreover, the lower limit of the content of the oxide sol contained in the sealing material for a honeycomb structure is desirably about 1% by weight, more desirably about 5% by weight as solids content. The upper limit thereof is desirably about 30% by weight, more desirably about 15% by weight, further more desirably about 9% by weight as solids content. The content of the oxide sol of about 1% or more by weight tends not to cause a decrease in the adhesive strength. On the contrary, the content of the oxide sol of about 30% or less by weight tends not to cause decreases in the thermal conductivity.

The lower limit of the content of the inorganic particles is desirably about 3% by weight, more desirably about 10% by weight, further desirably about 20% by weight as solids content. The upper limit of the content of the inorganic particles is desirably about 80% by weight, more desirably about 60% by weight, further more desirably about 40% by weight as solids contents. The content of the inorganic particles of about 3% or more by weight tends not to cause a decrease in thermal conductivity. On the contrary, the content thereof of about 80% or less by weight tends not to cause a decrease in the adhesive strength, when the adhesive layer or the peripheral sealing material layer is exposed to high temperatures.

The lower limit of the particle diameters of the inorganic particles is desirably about 0.01 μm, more desirably about 0.1 μm, and the upper limit of the particle diameters of the inorganic particles is desirably about 100 μm, more desirably about 15 μm, further more desirably about 10 μm. Use of the inorganic particles having particle diameter of about 0.01 μm or more tends not to lead to high costs, and the particle diameter of about 100 μm or less tends not to cause a decrease in the adhesive strength as well as in the thermal conductivity.

Moreover, the inorganic fibers preferably further contain at least about 60% by weight and at most about 85% by weight of silica, more preferably, at least about 70% by weight and at most about 80% by weight thereof. The above-mentioned silica indicates SiO or $SiO_2$.

Furthermore, the inorganic fibers preferably have a solubility of about 0.03% or more in a physiological saline solution at about 37° C.

Examples of the oxide sol include silica sol, alumina sol, zirconia sol and the like. These may be used alone, or two or more kinds of these may be used in combination. Silica sol is preferably used among these.

Moreover, the average particle diameter of the oxide sol is preferably at least about 5 nm and at most about 30 nm.

By using an oxide sol having a smaller average particle diameter, the adhesive strength to bond the honeycomb fired body tends to be improved. It is easy to manufacture the oxide sol having an average particle diameter of 5 nm or more, and such an oxide sol is easily available. Moreover, the oxide sol having an average particle diameter of 30 nm or less tends not to cause a decrease in the adhesive strength to bond the honeycomb fired body.

Here, the average particle diameter of the oxide sol can be measured, for example, by using the following method.

Specifically, when the oxide sol is silica sol, first, the silica sol is dried, and its BET specific surface area is measured.

Thereafter, supposing that silica particles in the silica sol are spherical particles of a solid material, the particle diameter is calculated from the following formula (1):

$$\text{BET specific surface area} = (6000/\rho)/\text{particle diameter} \quad (1)$$

(in the formula, $\rho$ is the true density of silica (2.2 g/cm$^3$).)

The particle diameter determined by this method is defined as the average particle diameter of the silica sol.

Moreover, the average particle diameter of the oxide sol can be directly measured by using, for example, TEM (Transmission Electron Microscope) and the like.

Examples of the inorganic particles may include carbides, nitrides and the like, and specific examples thereof may include inorganic powder, whiskers and the like made of silicon carbide, silicon nitride, boron nitride and the like. Each of these may be used alone, or two or more kinds of these may be used in combination. Silicon carbide, which is superior in thermal conductivity, is more preferably used among the inorganic particles.

It should be noted that in the present description, the whisker is included in the inorganic particles.

The sealing material for a honeycomb structure of the present embodiment preferably includes an organic binder. Examples of the organic binder include polyvinyl alcohol, methylcellulose, ethylcellulose, carboxymethylcellulose and the like. These may be used alone, or two or more kinds of these may be used in combination. Carboxymethylcellulose is preferably used among the organic binder.

The sealing material for a honeycomb structure of the present embodiment has a pH of at least about 4 and at most about 6.

Examples of the method for preparing a sealing material for a honeycomb structure having a pH adjusted in a range of at least about 4 and at most about 6 include the following method.

First, inorganic fibers, inorganic particles and an organic binder are mixed to prepare a mixture, and an alkaline oxide sol and an appropriate amount of water are further added to the mixture to prepare an alkaline mixture.

Although not particularly limited, the pH of the alkaline oxide sol is preferably at least about 8.5 and at most about 10.5.

Here, an alkaline silica sol is preferably used as the alkaline oxide sol.

Moreover, an acidic solution is mixed with the alkaline mixture to adjust the pH of the obtained paste in a range of at least about 4 and at most about 6.

Although not particularly limited, the pH of the acidic solution is preferably at least about 1 and at most about 3.

By mixing the acidic solution having a pH of at least about 1 and at most about 3 with the alkaline mixture, the pH of the paste tends to be easily adjusted to about 4.

Here, although not particularly limited, examples of the acidic solution include hydrochloric acid, sulfuric acid, nitric acid, phosphoric acid, lactic acid, acetic acid, formic acid and the like. In particular, a lactic acid aqueous solution is preferably used among these. By using the lactic acid aqueous solution, it is possible to enhance the safety upon carrying out the mixing operation.

Moreover, by using the method for adjusting the pH of the paste in a range of at least about 4 and at most about 6 by adding an acidic solution to the alkaline mixture, it may be easier to adjust the pH of the paste without using a strong alkaline solution.

For this reason, it may be easier to carry out the mixing operation safely.

Lastly, the paste having an adjusted pH is further mixed and kneaded to prepare the sealing material for a honeycomb structure.

The following description will discuss the honeycomb structure according to the embodiments of the present invention.

The honeycomb structure of the present embodiment is manufactured by using the above-mentioned sealing material for a honeycomb structure of the present embodiment.

Figure 2A:
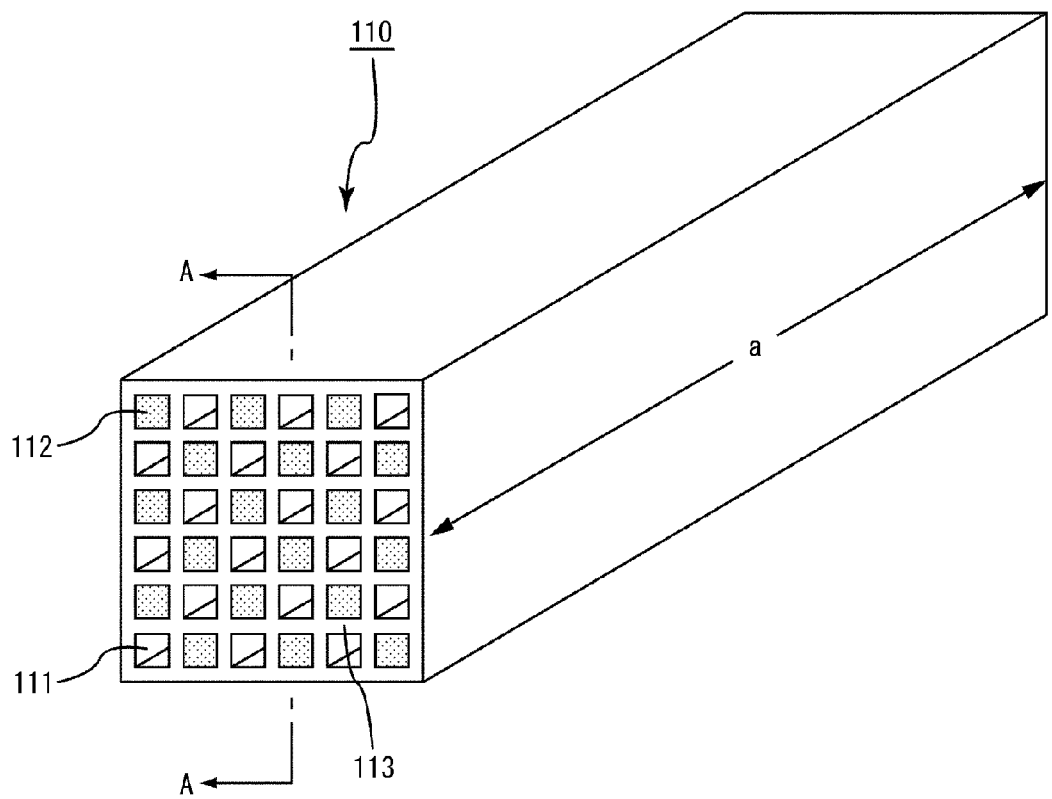
FIG. 2A is a perspective view that schematically shows one example of a honeycomb fired body that constitutes the honeycomb structure according to one embodiment of the present invention.

FIG. 1 is a perspective view that schematically shows one example of a honeycomb structure according to one embodiment of the present invention. FIG. 2A is a perspective view that schematically shows one example of a honeycomb fired body that constitutes the honeycomb structure according to one embodiment of the present invention, and FIG. 2B is an A-A line cross-sectional view of the honeycomb fired body shown in FIG. 2A.

Figure 2B:
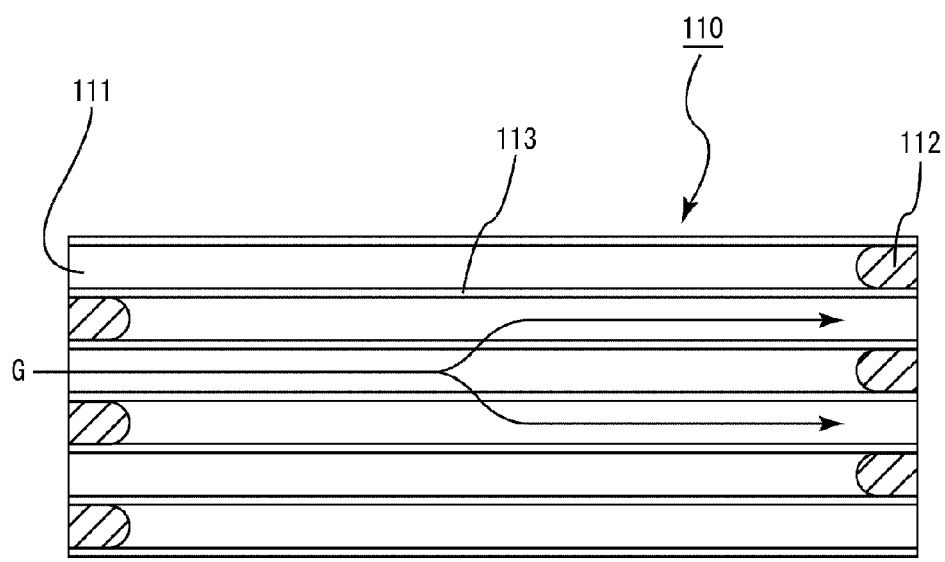
FIG. 2B is an A-A line cross-sectional view of the honeycomb fired body shown in FIG. 2A.

A honeycomb structure 100 shown in FIG. 1 has a structure in which a plurality of porous silicon carbide honeycomb fired bodies 110 having a shape shown in FIGS. 2A and 2B are combined with one another with an adhesive layer 101 interposed therebetween to form a ceramic block 103, with a peripheral sealing material layer 102 formed on the periphery 121 of the ceramic block 103.

The honeycomb fired body 110 shown in FIGS. 2A and 2B has a structure in which a large number of cells 111 are longitudinally placed (the direction a in FIG. 2A) in parallel with one another with a cell wall 113 therebetween, and either one end of each of the cells 111 is sealed with a plug 112. Therefore, exhaust gases G having flowed into one of the cells 111 with an opening end on one end face surely passes through the cell wall 113 that separates the cells 111, and flows out from another cell 111 with an opening end on the other end face.

Therefore, the cell wall 113 functions as a filter for capturing PM and the like.

In the honeycomb structure 100 of the present embodiment, the adhesive layer 101 and the peripheral sealing material layer 102 are formed by using the sealing material for a honeycomb structure of the present embodiment.

The following description will discuss an embodiment of a method for manufacturing the honeycomb structure of the present invention in which the honeycomb structure is manufactured by using the sealing material for a honeycomb structure of the present embodiment.

First, a combining process for forming an adhesive layer between a plurality of honeycomb fired bodies and bonding the plurality of honeycomb fired bodies to one another with the adhesive layer interposed therebetween and a peripheral sealing material layer forming process for forming a peripheral sealing material layer on a peripheral face of a ceramic block will be described, and then all the processes for manufacturing a honeycomb structure will be described.

First, the following description will discuss the combining process.

The method for forming the adhesive layer between the honeycomb fired bodies in the combining process is not particularly limited. As one example thereof, the following description will discuss a method in which the gap between the honeycomb fired bodies is filled with the adhesive including the sealing material for a honeycomb structure of the present embodiment and the adhesive is dried and solidified to form an adhesive layer.

Figure 3:
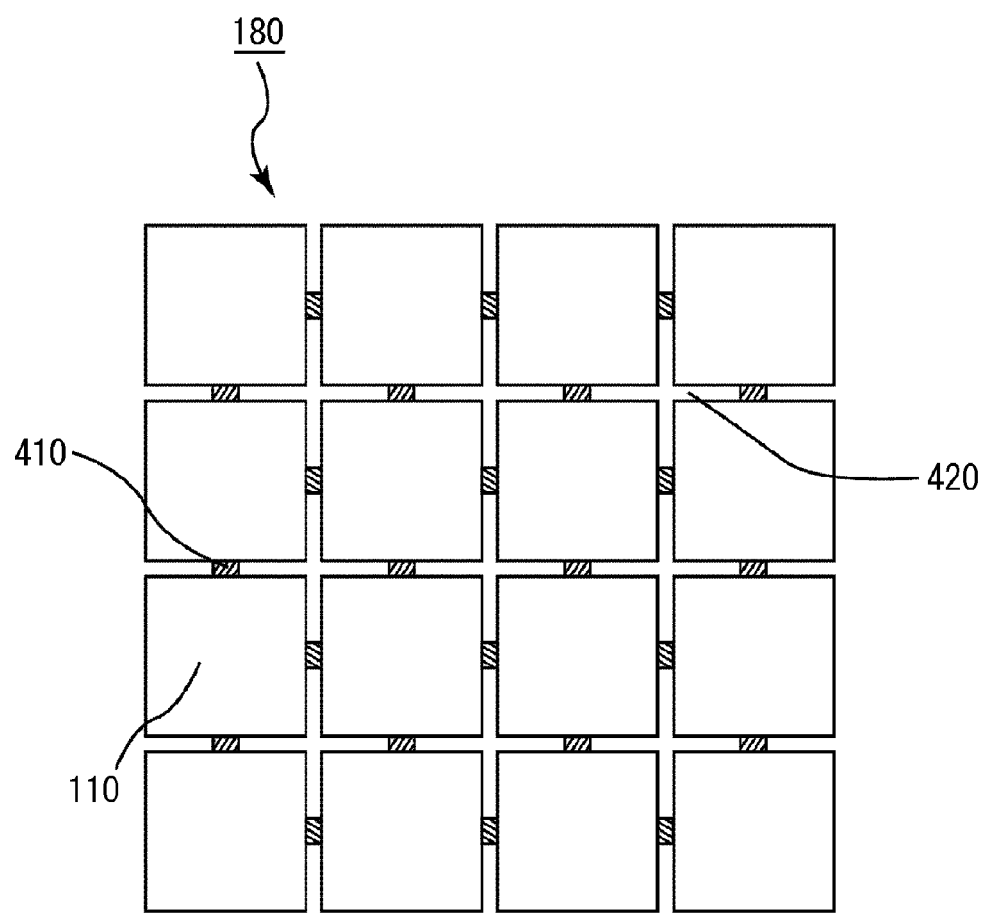
FIG. 3 is a cross-sectional view that schematically shows a cross-section obtained by cutting one example of a parallel-arranged body of honeycomb fired bodies according to one embodiment of the present invention in a direction perpendicular to the longitudinal direction thereof.

FIG. 3 is a cross-sectional view that schematically shows a cross-section obtained by cutting one example of a parallel-arranged body of honeycomb fired bodies according to one embodiment of the present invention in a direction perpendicular to the longitudinal direction thereof.

First, as shown in FIG. 3, a plurality of honeycomb fired bodies 110 are placed in parallel with one another in columns and rows, with a spacer 410 interposed therebetween. The spacer is designed to have the same thickness as the thickness of the adhesive layer to be formed between the honeycomb fired bodies. Therefore, a gap 420 corresponding to the thickness of the spacer is formed between the honeycomb fired bodies.

In the present embodiment, 16 pieces of honeycomb fired bodies are placed in parallel with one another in four columns and four rows to form a parallel-arranged body 180 of honeycomb fired bodies.

Successively, the gap formed between the honeycomb fired bodies placed in parallel with one another is filled with an adhesive paste by using a filling apparatus.

Figure 4:
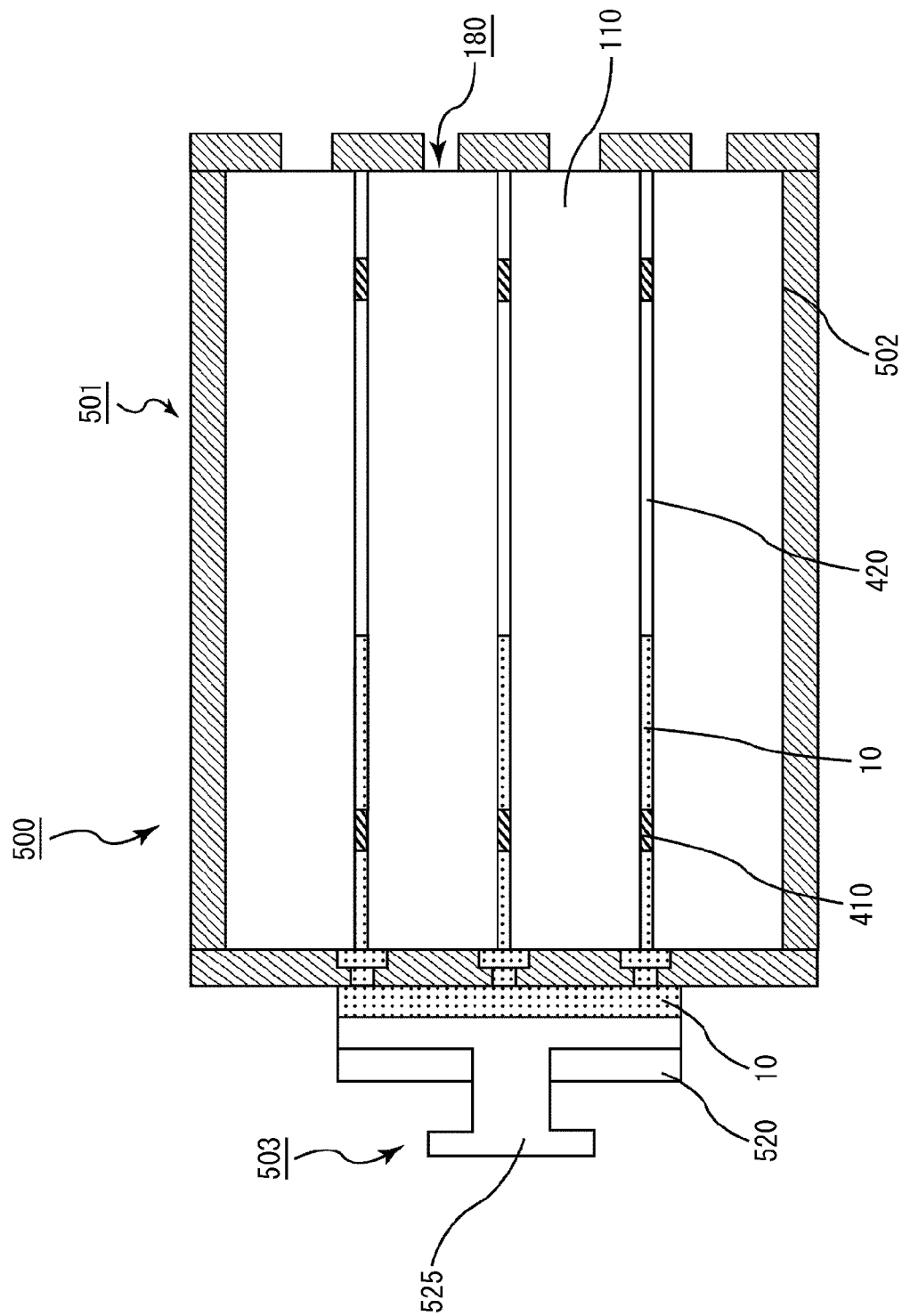
FIG. 4 is a cross-sectional view that schematically shows a cross-section obtained by cutting one example of a filling apparatus and a parallel-arranged body of honeycomb fired bodies according to one embodiment of the present invention placed in an inner space, in a direction parallel to the longitudinal direction of the parallel-arranged body of the honeycomb fired bodies.

FIG. 4 is a cross-sectional view that schematically shows a cross-section obtained by cutting one example of a filling apparatus and a parallel-arranged body of honeycomb fired bodies according to one embodiment of the present invention placed in an inner space, in a direction parallel to the longitudinal direction of the parallel-arranged body of the honeycomb fired bodies.

A filling apparatus 500 is provided with a tubiform (frame) 501 and a paste supply device 503. The tubiform 501 is provided with an inner space 502 which is allowed to accommodate a parallel-arranged body 180 of honeycomb fired bodies. The paste supply device 503 is provided with a paste chamber 520 for housing a paste-form adhesive 10 including the sealing material for a honeycomb structure of the present embodiment and an extruding mechanism 525 for extruding the adhesive 10 out of the paste chamber.

When filling the gap formed between the honeycomb fired bodies with the adhesive paste, the parallel-arranged body 180 of honeycomb fired bodies is placed inside the inner space 502 of the tubiform 501, and the paste supply device 503 is set up to the end face of the tubiform 501. Then, the adhesive 10 is extruded from the paste chamber 520 of the paste supply device 503 by using the extruding mechanism 525 to fill the gap 420 between the honeycomb fired bodies.

Through these processes, a laminated body of the honeycomb fired bodies including the 16 pieces of honeycomb fired bodies with the gap filled with the adhesive including the sealing material for a honeycomb structure is manufactured.

Successively, the laminated body of the honeycomb fired bodies is heated by using a drying apparatus or the like to dry and solidify the adhesive, and an adhesive layer is subsequently formed so that the honeycomb fired bodies are bonded to one another.

Through these processes, a rectangular pillar-shaped ceramic block including 16 pieces of honeycomb fired bodies can be manufactured.

Further, a periphery cutting process is carried out to form the ceramic block into a round pillar-shape by cutting the side faces of the ceramic block using a diamond cutter or the like.

The following description will discuss a peripheral sealing material layer forming process.

Although the method for forming a peripheral sealing material layer on the peripheral face of the ceramic block is not particularly limited, and example thereof include a method in which the sealing material for a honeycomb structure of the present embodiment is applied to the peripheral face of a ceramic block by using a squeegee to form a peripheral sealing material paste layer, and the sealing material for a honeycomb structure is dried and solidified.

These methods allows formation of the adhesive layer between the plurality of honeycomb fired bodies and formation of the peripheral sealing material layer on the peripheral face of the ceramic block by using the sealing material for a honeycomb structure of the present embodiment.

The following description will discuss all the processes for manufacturing the honeycomb structure.

First, as a ceramic raw material, silicon carbide powders having different average particle diameters, an organic binder, a plasticizer in liquid form, a lubricant and water are mixed to prepare a wet mixture for manufacturing a molded body.

Successively, this wet mixture is loaded into an extrusion molding machine.

When the wet mixture is loaded into the extrusion molding machine, the wet mixture is extrusion-molded into a honeycomb molded body having a predetermined shape.

Next, the honeycomb molded body is cut into a predetermined length, and dried by using a drying apparatus, such as a microwave drying apparatus, a hot-air drying apparatus, a dielectric drying apparatus, a reduced-pressure drying apparatus, a vacuum drying apparatus and a freeze drying apparatus, and a sealing process is carried out by filling predetermined cells with a plug material paste to be a plug for sealing the cells.

Next, a degreasing process is carried out to remove the organic components in the honeycomb molded body by heating the honeycomb molded body in a degreasing furnace. Then, a firing process is carried out to manufacture a honeycomb fired body.

Through the above-mentioned processes, the honeycomb fired body is manufactured.

Here, conditions conventionally used upon manufacturing a honeycomb fired body are applicable for carrying out the cutting, drying, sealing, degreasing and firing processes.

Thereafter, as described above, the combining process, the periphery cutting process and the peripheral sealing material layer forming process are carried out by using the honeycomb fired bodies thus manufactured to manufacture a honeycomb structure.

The following description will summarize the effects of the sealing material for a honeycomb structure, the honeycomb structure and the method for manufacturing a honeycomb structure of the present embodiment.

(1) The inorganic fibers contained in the sealing material for a honeycomb structure of the present embodiment include at least one kind selected from the group consisting of an alkali metal compound, an alkaline earth metal compound and a boron compound. Since these compounds are so-called biosoluble fibers, the sealing material for a honeycomb structure tends to be highly safe to the human body.

Moreover, the honeycomb structure manufactured by using the sealing material for a honeycomb structure of the present embodiment tends to be highly safe to the human body.

(2) Moreover, since the pH of the sealing material for a honeycomb structure is about 4 or more, the inorganic particles tend not to aggregate after preparation of the paste.

Moreover, since the pH of the sealing material for a honeycomb structure is about 6 or less, the sealing material tends not to gelate even after preparation of the paste. For this reason, it may become easier to prevent a deterioration in the flowability of the paste and an increase in the viscosity thereof, even a long time after preparation of the paste.

Therefore, even a long time after preparation of the paste, the sealing material for a honeycomb structure tends to maintain superior coating properties to the ceramic block and the like.

(3) Moreover, the average particle diameter of the oxide sol in the sealing material for a honeycomb structure is at least about 5 nm and at most about 30 nm. The oxide sol having an average diameter of at least about 5 nm and at most about 30 nm is easily prepared or easily available.

Moreover, it may become easier to increase the adhesive strength between the ceramic block and the peripheral sealing material layer.

Furthermore, it may become easier to increase the adhesive strength between the honeycomb fired bodies.

(4) Moreover, since the sealing material for a honeycomb structure is prepared by mixing an acidic solution with an alkaline mixture, the pH of the sealing material tend to be easily controlled in a range of at least about 4 and at most about 6 without using an alkaline solution.

Furthermore, use of a lactic acid solution as the acidic solution tends to enhance the safety upon carrying out the processes for preparing the sealing material for a honeycomb structure.

(5) When forming the adhesive layer, the gap between the honeycomb fired bodies is filled with the sealing material for a honeycomb structure of the present embodiment. Since the sealing material for a honeycomb structure in the present embodiment tends not to cause a decrease in the flowability and an increase in the viscosity of the paste even a long time after preparation of the paste, it may become easier to fill with the sealing material for a honeycomb structure as an adhesive.

(6) Moreover, in the peripheral sealing material layer forming process, the sealing material for a honeycomb structure of the present embodiment is applied to the peripheral face of the ceramic block. Since the sealing material for a honeycomb structure in the present embodiment tends not to cause a decrease in the flowability and an increase in the viscosity of the paste even a long time after preparation of the paste, it may become easier to improve the workability upon forming the peripheral sealing material paste layer on the peripheral face of the ceramic block in the peripheral sealing material layer forming process.

EXAMPLES

The following description will discuss examples that more specifically disclose the first embodiment of the present invention. Here, the present invention is not intended to be limited only to the examples.

In each of Examples, Comparative Examples and Reference Example, a sealing material for a honeycomb structure was prepared by using an oxide sol having an average particle diameter of 5 to 40 nm and either one of inorganic fibers A and B having a composition shown in Table 1.

TABLE 1

|  | Inorganic fiber A | Inorganic fiber B |
|---|---|---|
| SiO$_2$ (% by weight) | 70.8 | 74.8 |
| MgO (% by weight) | 0.6 | 17.9 |
| CaO (% by weight) | 25.9 | 4.4 |
| Al$_2$O$_3$ (% by weight) | 0.8 | 1.3 |
| Others (% by weight) | 1.9 | 1.6 |

The oxide sol used in each of Examples, Comparative Examples and Reference Example was an alkaline silica sol, and the composition of the oxide sol was 20.4% by weight of SiO$_2$, 0.11% by weight of Na$_2$O, 0.17% by weight of Al$_2$O$_3$ and 79.3% by weight of H$_2$O, and the pH of the oxide sol was 8.8.

Moreover, both of the inorganic fibers A and B were bio-soluble fibers, and the inorganic fibers A mainly contain CaO as the alkaline earth metal compound, and the inorganic fibers B mainly contain MgO as the alkaline earth metal compound.

Example 1

Preparation of Sealing Material for Honeycomb Structure

An amount of 43.9 parts by weight of the inorganic fibers A as the inorganic fibers, 36.8 parts by weight of SiC powders as the inorganic particles and 0.5 parts by weight of carboxymethylcellulose (CMC) as an organic binder were mixed to prepare a mixture, and 20.4 parts by weight of an alkaline oxide sol having an average particle diameter of 12 nm and 15.7 parts by weight of water were further added to the mixture to prepare an alkaline mixture.

The pH of this alkaline mixture was 8.5.

To the alkaline mixture, 0.7 parts by weight of a lactic acid aqueous solution (pH 2.0) was added as an acidic solution to adjust the pH of the mixture to 5.0, and the mixture was further mixed and kneaded to prepare a sealing material for a honeycomb structure.

Examples 2, 3 and Comparative Examples 1, 2

Sealing materials for a honeycomb structures were prepared by following the same procedure as in Example 1 except that the amount of the lactic acid aqueous solution was changed or the kind and the amount of the acidic solution were changed to adjust the pH of the respective sealing materials for a honeycomb structures as shown in Table 2.

TABLE 2

|  | Oxide sol | | Acidic solution | | | Evaluation result | | | | | |
|---|---|---|---|---|---|---|---|---|---|---|---|
|  | Average particle diameter (nm) | Inorganic fibers Kind | Kind | Blending amount (parts by weight) | pH | Flowability (N) | Viscosity (Pa·S) | External appearance after one day | Filling property | Adhesive strength (N) | External appearance of PSML* |
| Example 1 | 12 | A | Lactic acid | 0.7 | 5.0 | 6.95 | 47.9 | Good | Good | 320 | Good |
| Example 2 | 12 | A | Lactic acid | 11.0 | 4.0 | 6.05 | 42.4 | Good | Good | 270 | Good |
| Example 3 | 12 | A | Lactic acid | 0.5 | 6.0 | 7.88 | 50.3 | Good | Good | 274 | Good |
| Comparative Example 1 | 12 | A | Hydrochloric acid | 1.0 | 3.0 | 4.12 | 25.6 | Bad | Bad | — | — |
| Comparative Example 2 | 12 | A | Lactic acid | 0.3 | 7.0 | NA** | 58.8 | Bad | Bad | — | — |
| Comparative Example 3 | 12 | A | None | — | 8.5 | NA** | 61.4 | Bad | Bad | — | — |

*PSML = peripheral sealing material layer

**NA = Not Available

Comparative Example 3

A sealing material for a honeycomb structure was prepared by following the same procedure as in Example 1 except that the lactic acid aqueous solution was not added.

Table 2 collectively shows the average particle diameter of the oxide sol, the kinds of the inorganic fibers and the acidic solution and the like.

Examples 4 to 6 and Reference Example 1

Sealing materials for a honeycomb structure were prepared by following the same procedure as in Example 1 except that the average particle diameters of the oxide sols contained in the respective sealing materials for a honeycomb structure were 5 nm, 23 nm, 30 nm and 40 nm as shown in Table 3.

TABLE 3

| | Oxide sol | | Acidic solution | | | Evaluation result | | | | | |
|---|---|---|---|---|---|---|---|---|---|---|---|
| | Average particle diameter (nm) | Inorganic fibers Kind | Kind | Blending amount (parts by weight) | pH | Flowability (N) | Viscosity (Pa·S) | External appearance after one day | Filling property | Adhesive strength (N) | External appearance of PSML* |
| Example 4 | 5 | A | Lactic acid | 0.7 | 5.0 | 7.23 | 51.4 | Good | Good | 388 | Good |
| Example 5 | 23 | A | Lactic acid | 0.7 | 5.0 | 6.71 | 39.8 | Good | Good | 272 | Good |
| Example 6 | 30 | A | Lactic acid | 0.7 | 5.0 | 5.48 | 29.5 | Good | Good | 244 | Good |
| Reference Example 1 | 40 | A | Lactic acid | 0.7 | 5.0 | 4.30 | 27.4 | Good | Good | 60 | Bad |

*PSML = peripheral sealing material layer

Table 3 collectively shows the kinds of the oxide sol, the inorganic fibers and the acidic solution used in Examples 4 to 6 and Reference Example 1, and the like.

Examples 7 to 9

Sealing materials for a honeycomb structure were prepared by following the same procedure as in Example 1 except that the kind of the inorganic fibers was changed in Example 7, and the kinds of the acidic solutions were changed in Examples 8 and 9.

Table 4 collectively shows the kinds of the oxide sol, the inorganic fibers and the acidic solution used in Examples 7 to 9, and the like.

tured. First, manufacturing of the honeycomb fired bodies will be described, and then the respective evaluation methods will be described.

(Manufacturing of Honeycomb Fired Body)

An amount of 52.8% by weight of a silicon carbide coarse powder having an average particle diameter of 22 μm and 22.6% by weight of a silicon carbide fine powder having an average particle diameter of 0.5 μm were mixed. To the resulting mixture, 2.1% by weight of an acrylic resin, 4.6% by weight of an organic binder (methylcellulose), 2.8% by weight of a lubricant (UNILUB, manufactured by NOF Corporation), 1.3% by weight of glycerin, and 13.8% by weight of water were added, and then kneaded to prepare a wet mixture. The obtained wet mixture was extrusion-molded, so that a raw honeycomb molded body having virtually the same shape as the shape shown in FIG. 2A and having cells not sealed was manufactured.

Next, the raw honeycomb molded body was dried by using a microwave drying apparatus to obtain a dried honeycomb molded body. Then, using a paste having the same composition as that of the raw molded body, predetermined cells were filled, and the dried honeycomb molded body thus filled was again dried by using a drying apparatus.

The dried honeycomb molded body was degreased at 400° C., and then fired at 2200° C. under normal pressure argon atmosphere for three hours, so that a honeycomb fired body including a silicon carbide sintered body, with a porosity of

TABLE 4

| | Oxide sol | | Acidic solution | | | Evaluation result | | | | | |
|---|---|---|---|---|---|---|---|---|---|---|---|
| | Average particle diameter (nm) | Inorganic fibers Kind | Kind | Blending amount (parts by weight) | pH | Flowability (N) | Viscosity (Pa·S) | External appearance after one day | Filling property | Adhesive strength (N) | External appearance of PSML* |
| Example 7 | 12 | B | Lactic acid | 0.7 | 5.0 | 6.14 | 43.5 | Good | Good | 248 | Good |
| Example 8 | 12 | A | Phosphoric acid | 0.7 | 5.0 | 6.87 | 46.9 | Good | Good | 245 | Good |
| Example 9 | 12 | A | Acetic acid | 0.7 | 5.0 | 7.22 | 48.8 | Good | Good | 250 | Good |

*PSML = peripheral sealing material layer

The sealing materials for a honeycomb structure were evaluated by the following methods.

Here, for the evaluation of the sealing materials for a honeycomb structure, honeycomb fired bodies were manufac- 45%, an average pore diameter of 15 μm, a size of 34.3 mm×34.3 mm×150 mm, the number of cells (cell density) of 300 pcs/inch² and a thickness of the cell wall of 0.25 mm (10 mil), was manufactured.

(Evaluation of Flowability of Sealing Material for Honeycomb Structure)

The flowability was measured on the respective sealing materials for a honeycomb structure prepared in Examples, Comparative Examples and Reference Example by using a flowability measuring apparatus, immediately after preparation, one day, two days and three days after preparation, respectively.

Figure 5A:
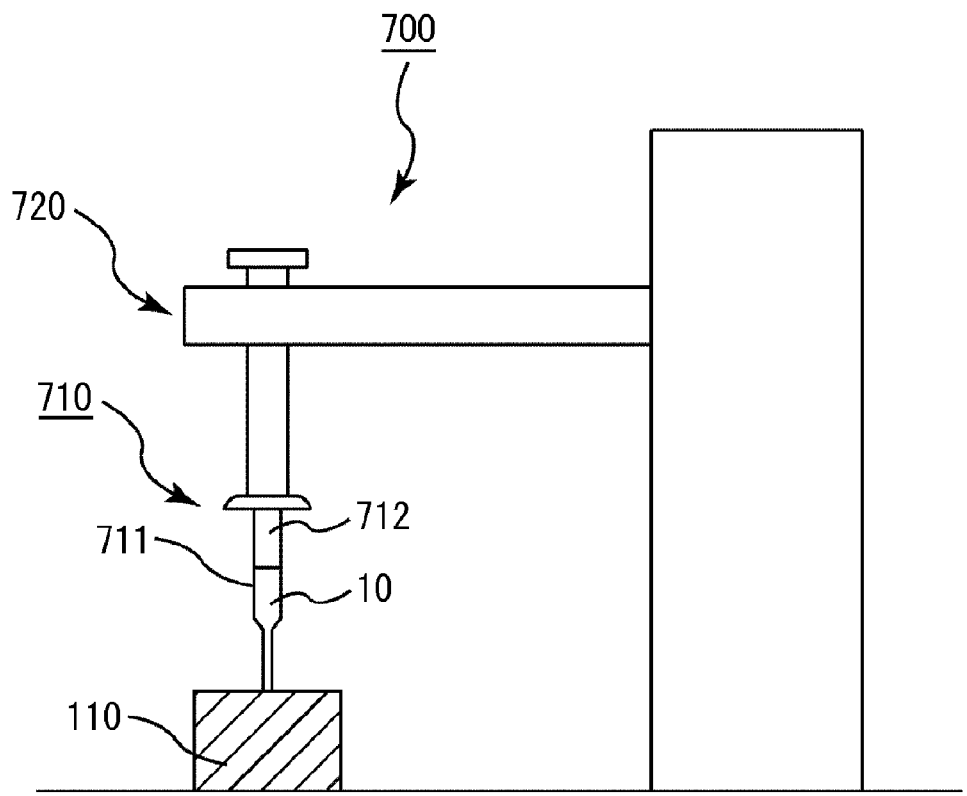
FIG. 5A is a side view that schematically shows a flowability measuring method.
Figure 5B:
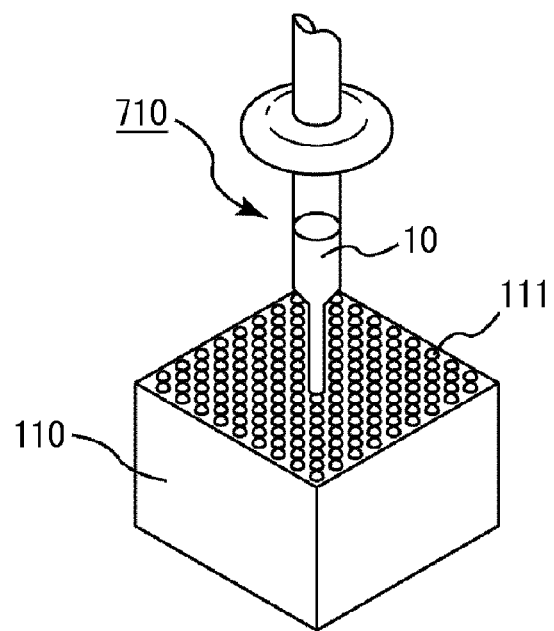
FIG. 5B is a perspective view that schematically shows injection of the sealing material.

FIG. 5A is a side view that schematically shows the flowability measuring method, and FIG. 5B is a perspective view that schematically shows injection of the sealing material.

The flowability measuring device 700 used for measuring the flowability, shown in FIG. 5A, is provided with a syringe 710 having a cylinder 711 for housing a liquid-form substance whose flowability is to be measured and a piston 712 for extruding the liquid-form substance, and a load cell 720 for moving the piston 712 and measuring a load applied to the piston 712.

When measuring the flowability, a predetermined amount of a sealing material 10 for a honeycomb structure was loaded into the cylinder 711 of the syringe 710, and as shown in FIG. 5B, the tip of the syringe 710 is set to have contact with the opening of the cell 111 of a honeycomb fired body 110.

Here, a honeycomb fired body that had been cut into a predetermined length (about 30 mm) was used as the honeycomb fired body.

Then, the load cell 720 was moved 10 mm at a velocity of 10 mm/sec so that the sealing material 10 for a honeycomb structure was extruded from the tip of the syringe 710, and injected into the cell 111.

Moreover, loads (N) applied to the piston upon injecting the sealing material for a honeycomb structure were measured, and the largest value of the loads was defined as a value for flowability.

That is, a sealing material for a honeycomb structure having a higher value of the flowability flow tends to have difficulties to flow, and have poor flowability.

Tables 2 to 4 show the flowability measured one day after preparation of the sealing materials for a honeycomb structure.

Figure 6:
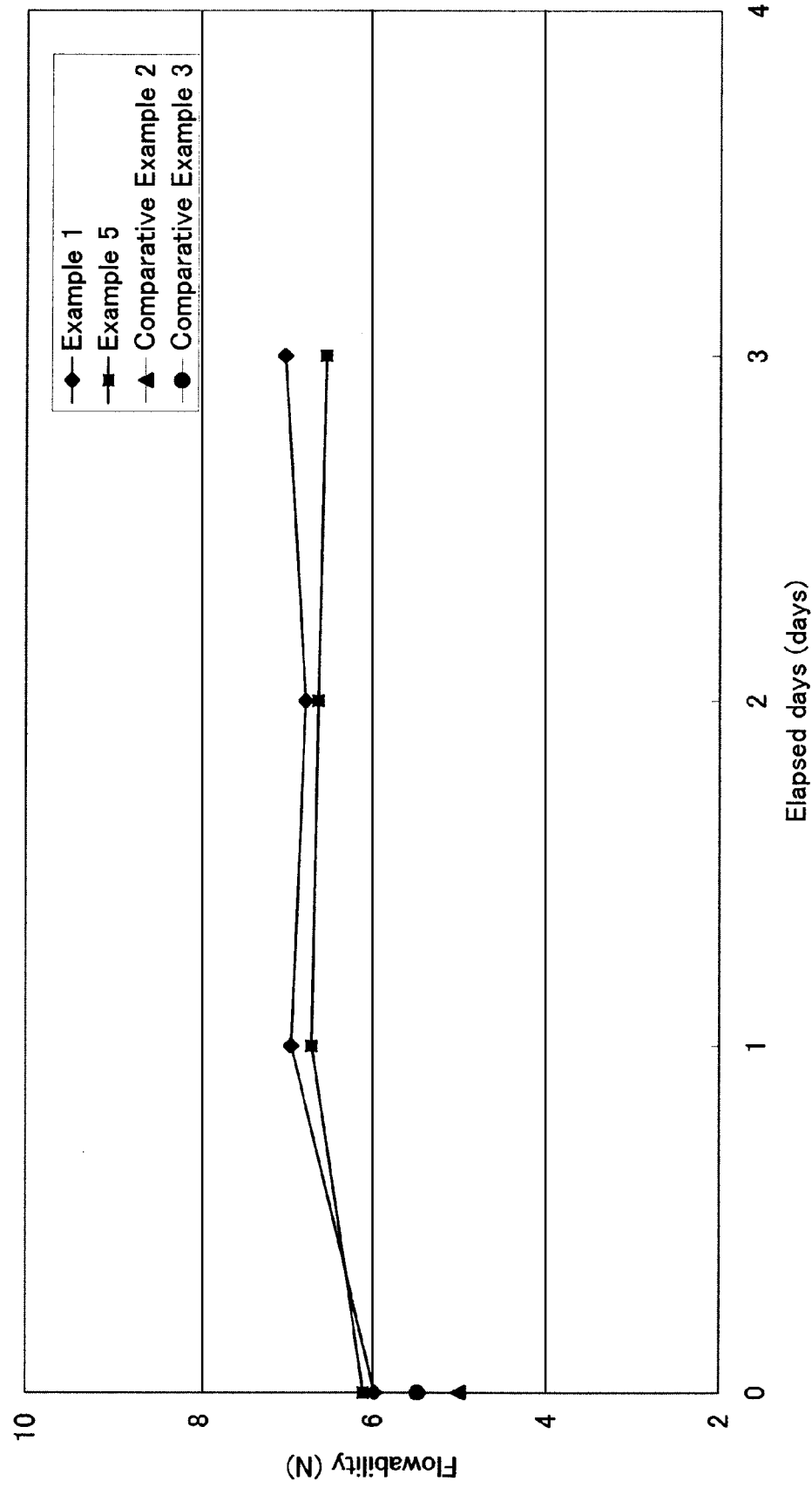
FIG. 6 is a graph that shows the relationship between elapsed days after preparation and flowability, with respect to sealing materials for a honeycomb structure prepared in Examples 1 and 5, and Comparative Examples 2 and 3.

Moreover, FIG. 6 is a graph that shows the relationship between elapsed days after preparation and the flowability, with respect to the sealing materials for a honeycomb structure of Examples 1 and 5, and Comparative Examples 2 and 3.

In the sealing materials for a honeycomb fired body of Examples 1 and 5, there was hardly any change in the flowability even three days after preparation. On the other hand, in the sealing materials for a honeycomb fired body of Comparative Examples 2 and 3, the values of flowability became higher (higher loads were required to allow the sealing materials for a honeycomb structure to flow) and gelation developed together with the lapse of time. The sealing materials were no longer extruded from the syringe one day after preparation, thereby making it possible to measure the flowability.

(Measurement of Viscosity of Sealing Material for Honeycomb Structure)

The viscosity was measured on the respective sealing materials for a honeycomb structure prepared in Examples, Comparative Examples and Reference Example by using a B-type viscometer at a rotational speed of 10 rpm, immediately after preparation, one day, two days and three days after preparation, respectively.

Tables 2 to 4 show the viscosity measured one day after preparation of the sealing materials for a honeycomb structure.

Figure 7:
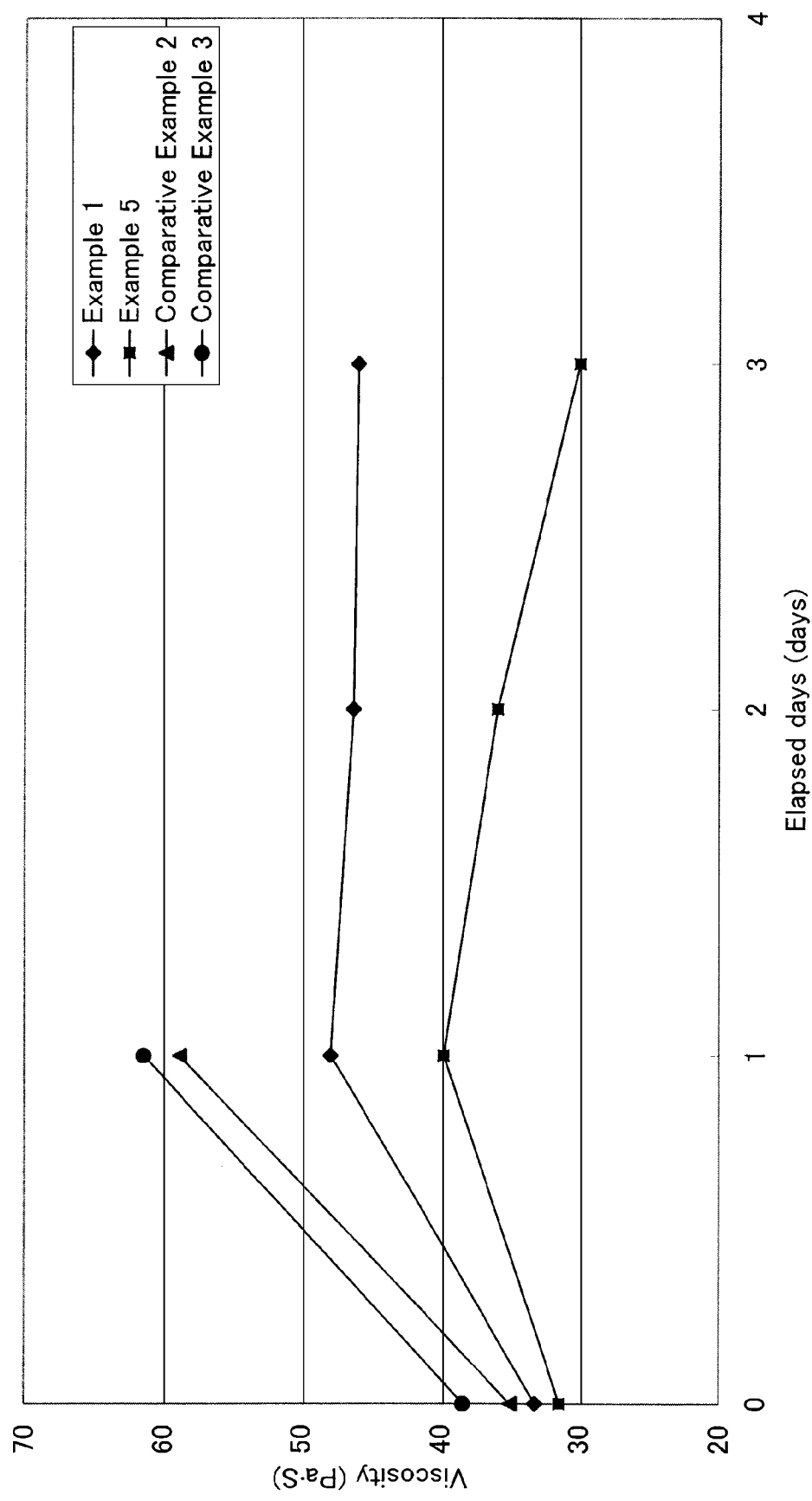
FIG. 7 is a graph that shows the relationship between elapsed days after preparation a viscosity, with respect to the sealing materials for a honeycomb structure prepared in Examples 1 and 5, and Comparative Examples 2 and 3.

Moreover, FIG. 7 shows the relationship between elapsed days after preparation and the viscosity, with respect to the sealing materials for a honeycomb structure of Examples 1 and 5, and Comparative Examples 2 and 3.

In the sealing materials for a honeycomb fired body of Examples 1 and 5, there was hardly any change in the viscosity even three days after preparation. In contrast, in the sealing materials for a honeycomb fired body of Comparative Examples 2 and 3, the viscosity became higher and gelation developed together with the lapse of time. It was impossible to measure the viscosity two days after preparation of the sealing materials.

(Observation of External Appearance of Sealing Material for Honeycomb Structure One Day After Preparation)

One day after preparation, external appearance of each of the sealing materials for a honeycomb structure prepared in Examples, Comparative Examples and Reference Example was visually observed. Tables 2 to 4 show the external appearances thus observed.

In the respective Tables, "bad" indicates that gelation of a sealing material for a honeycomb structure or aggregation of inorganic fibers was found, and "good" indicates a sealing material for a honeycomb structure having good appearance.

The results of the observation of external appearance show that the sealing material for a honeycomb structure of Comparative Example 1 had an aggregation of the inorganic particles. Presumably, this is because the pH of the sealing material for a honeycomb structure was as low as 3.0.

Moreover, gelation occurred in the respective sealing materials for a honeycomb structure of Comparative Examples 2 and 3. Presumably, this is because the pH of the sealing materials for a honeycomb structure was as high as 7.0 or 8.5.

In contrast, in each of the sealing materials for a honeycomb structure of Examples and Reference Example, neither aggregation of the inorganic particles nor gelation occurred, and the same good appearance as that immediately after preparation was maintained.

(Observation of Filling Property of Sealing Material for Honeycomb Structure)

In the present example, 16 pieces of honeycomb fired bodies were arranged in four columns and four rows with a spacer interposed therebetween to form a parallel-arranged body of honeycomb fired bodies.

Moreover, the parallel-arranged body was placed in a filling device, and each of the sealing materials for a honeycomb structure prepared in Examples, Comparative Examples and Reference Example was loaded into a paste chamber of the filling device.

Then, a force of 800 gf (7.85 N) was applied to the sealing material for a honeycomb structure by using an extrusion mechanism to fill the gap between the honeycomb fired bodies with the sealing material for a honeycomb structure.

In Tables 2 to 4, "good" indicates desirable results of filling with a sealing material for a honeycomb structure, that is, indicates that the sealing material was allowed to reach the opposite end face to the extrusion mechanism. In contrast, "bad" indicates partial filling with a sealing material for a honeycomb structure, that is, indicates that the sealing material for a honeycomb structure was allowed to reach only halfway to the opposite end face to the extrusion mechanism.

Here, the sealing materials for a honeycomb structure one day after preparation were used.

The results of the observation of filling properties show that when the sealing materials for a honeycomb structure prepared in respective Examples and Reference Example were used, the gaps between the honeycomb fired bodies were desirably filled.

In contrast, when the sealing materials for a honeycomb structure prepared in respective Comparative Examples were used, the gaps between the honeycomb fired bodies were filled only halfway with the respective sealing material for a honeycomb structure, that is, the sealing materials for a honeycomb structure showed the insufficient filling properties.
(Evaluation of Adhesive Strength Between Honeycomb Fired Bodies and Evaluation of Adhesive Strength between Ceramic Block and Peripheral Sealing Material Layer)

In the observation tests of filling properties (of respective Examples and Reference Examples), each sample (laminated body of honeycomb fired bodies) with the gap between honeycomb fired bodies desirably filled with the sealing material for a honeycomb structure was heated at 120° C. in a drying apparatus to form an adhesive layer by solidifying the sealing material for a honeycomb structure so that a ceramic block was manufactured.

Successively, the side faces of the ceramic block were cut into a cylindrical shape by using a diamond cutter, and each of the sealing materials for a honeycomb structure prepared in respective Examples and Reference Examples was applied to the peripheral face of the cut ceramic block by using a squeegee to form a peripheral sealing material paste layer.

Next, the sealing material for a honeycomb structure was solidified by heating at 120° C. in a drying apparatus to form a peripheral sealing material layer, and thus a honeycomb structure was manufactured.

A sample (69 mm in width×34.3 mm in depth×25 mm in height) is cut out from the manufactured honeycomb structure to have an adhesive layer (thickness: 1 mm) vertically positioned in the middle portion thereof and two honeycomb fired bodies (size: 34.3 mm×34.3 mm×25 mm) positioned on the opposite sides of the adhesive layer.

Next, the three-point bending test was carried out in accordance with JIS R 1601 on each sample thus manufactured to measure an adhesive strength (load) between the honeycomb fired bodies.

For measurement, a loaded point was set to be on a part of the adhesive layer, and then the three-point bending test was carried out by using an Instron tensile meter to measure a load (N) at the time of breakage. Here, the distance between fulcrums was set to 57 mm.

The contents of JIS R 1601 are incorporated herein by reference in their entirety.

Tables 2 to 4 show the load as the adhesive strength (N).

Figure 8:
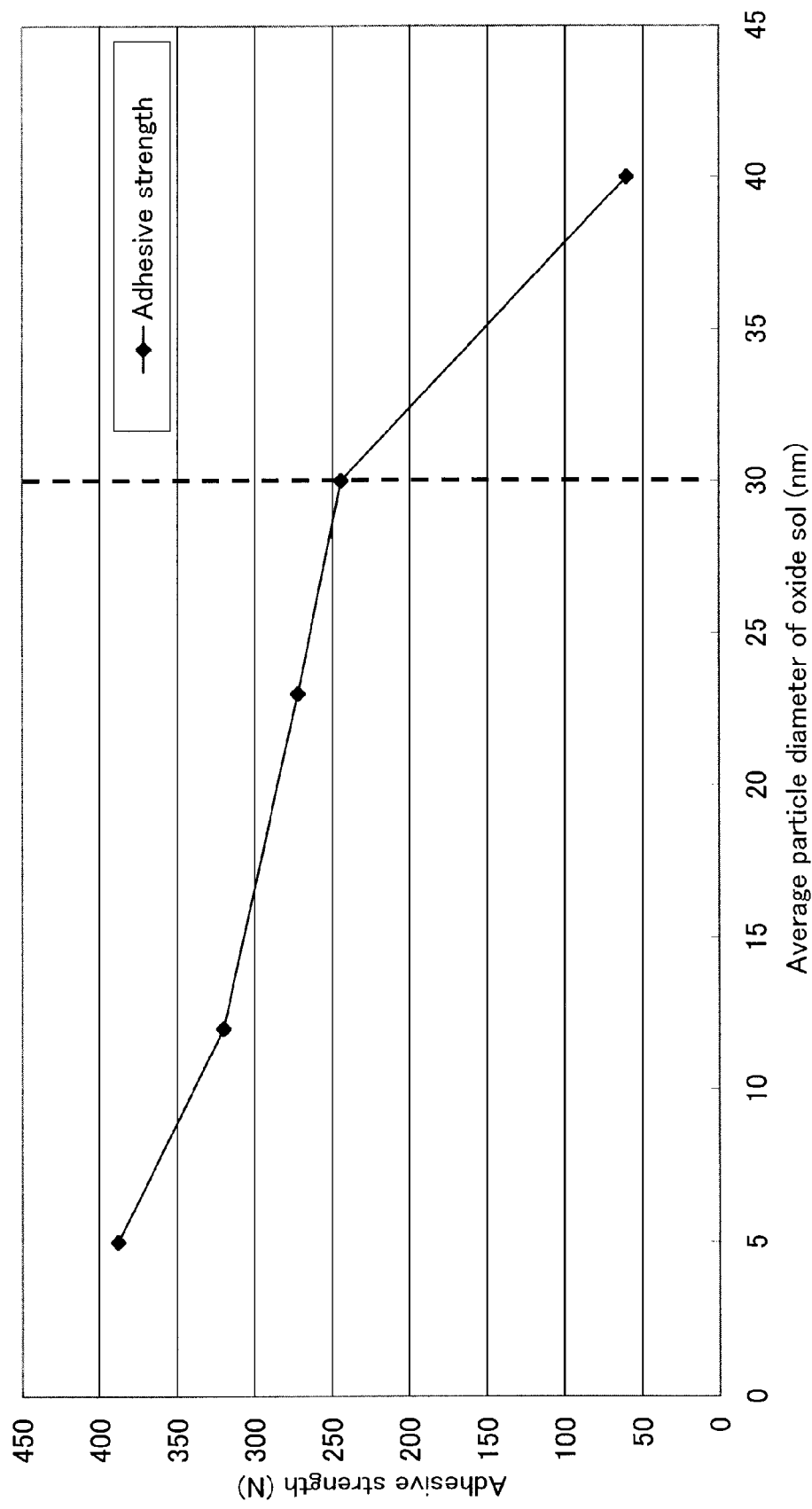
FIG. 8 is a graph that shows the relationship between an average particle diameter of an oxide sol and an adhesive strength between honeycomb fired bodies according to one embodiment of the present invention.

In addition, based upon the results of the measurement of the adhesive strength of Examples 1, 4 to 6 and Reference Example 1, FIG. 8 shows the relationship between the average particle diameter of the oxide sol and the adhesive strength between the honeycomb fired bodies.

The results of the measurement of the adhesive strength show that the sealing materials for a honeycomb structure containing the oxide sol with an average particle diameter of about 30 nm or less have an adhesive strength of as high as 200 N or more.

In contrast, the sealing materials for a honeycomb fired bodies containing the oxide sol with an average particle diameter exceeding about 30 nm have a slightly low adhesive strength of 60 N.

Moreover, with respect to the honeycomb structures thus manufactured, the adhesive strength between the ceramic block and the peripheral sealing material layer was evaluated.

As an apparatus for evaluating the adhesive strength, an apparatus including: a 2 L (liter) common-rail-type diesel engine; an exhaust-gas pipe connected to the honeycomb filter, which allows exhaust gases from the engine to pass through; and a honeycomb filter having a metal casing in which each honeycomb structure was housed, was used.

In this apparatus, the engine was driven at the number of revolutions of 2000 $min^{-1}$ and a torque of 47 Nm so that exhaust gases from the engine were allowed to pass through each of the honeycomb structures, and 10 minutes of regenerating treatment of the honeycomb structures by using a post-injection system was conducted for every driving operation corresponding to a travel distance of 500 km. This was defined as one cycle.

After repeating this cycle 200 times, the state of the peeling of the peripheral sealing material layer from the peripheral face of the ceramic block was visually observed.

In Tables 2 to 4, "good" indicated that no peeling was observed between the peripheral sealing material layer and the peripheral face of the ceramic block, and "bad" indicated that peeling was observed.

Here, the results show that the sealing material for a honeycomb structure containing the oxide sol with an average particle diameter of about 30 nm or less had no peeling between the peripheral sealing material layer and the peripheral face of the ceramic block.

In contrast, the sealing materials for a honeycomb structure containing the oxide sol with an average particle diameter exceeding about 30 nm had peeling between the peripheral sealing material layer and the peripheral face of the ceramic block.

The results of the evaluation of the adhesive strength presumably explained by the fact that the oxide sol having an average particle diameter of about 30 nm or less exerts a higher anchoring effect between the oxide sol and the honeycomb fired bodies.

A sealing material for a honeycomb structure was prepared by using an alkaline silica sol having an average particle diameter of 5 to 40 nm and a pH of 10.0 as the oxide sol, and the composition of the alkaline silica sol was 30.6% by weight of $SiO_2$, 0.23% by weight of $Al_2O_3$ and 69.2% by weight of $H_2O$. Then, the same tests as in respective Examples, Reference Example and Comparative Examples were carried out, and consequently, the same results as those of respective Examples, Reference Example and Comparative Examples were obtained.

Here, the respective evaluation results of properties, such as the flowability, viscosity and filling properties, measured on the sealing material for a honeycomb structure manufactured in each of present Examples and Reference Example, were similar to the evaluation results of the properties, such as the flowability, viscosity and filling properties, of conventionally-used sealing materials for a honeycomb structure using non biosoluble fibers (for example, a sealing material for a honeycomb structure containing non biosoluble silica-alumina fibers, silicon carbide, methylcellulose, silica sol and water). This indicates that the sealing material for a honeycomb structure containing biosoluble fibers, manufactured in each of present Examples and Reference Example, can be used for the same applications of the conventionally-used sealing material for a honeycomb structure.

Second Embodiment

The following description will discuss a second embodiment that is another embodiment of the present invention.

In the present embodiment, although the composition of the sealing material for a honeycomb structure and the structure of the honeycomb structure are the same as in the first embodiment, a different method for forming an adhesive layer is used in the method for manufacturing a honeycomb structure.

Figure 9:
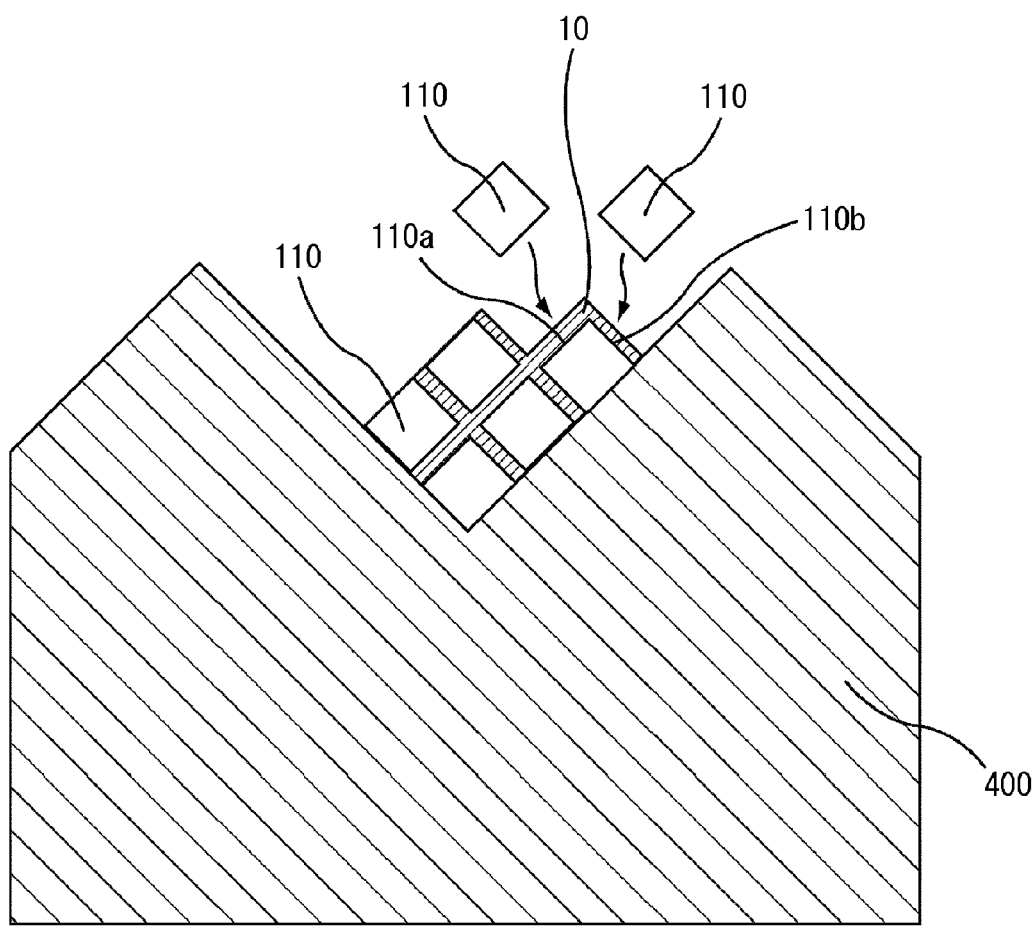
FIG. 9 is an explanatory view that schematically shows a method for applying an adhesive to side faces of a honeycomb fired body according to one embodiment of the present invention.

FIG. 9 is an explanatory view that schematically shows a method for applying an adhesive to side faces of a honeycomb fired body according to one embodiment of the present invention.

A honeycomb fired body 110 was placed to be inclined on a base 400 having an upper portion with a V-shaped cut surface which allows lamination of the honeycomb fired bodies 110 being inclined. Thereafter, a paste-form adhesive including the sealing material for a honeycomb structure is applied with an even thickness to two side faces 110a and 110b facing upward. Then, another honeycomb fired body 110 was repeatedly laminated on the adhesive 10.

By using this method, a laminated body of honeycomb fired bodies in which the adhesive is applied to the side faces of each honeycomb fired bodies is manufactured. Next, the laminated body of the honeycomb fired bodies is heated by using a drying apparatus or the like, and the adhesive is subsequently dried and solidified to form an adhesive layer between the honeycomb fired bodies.

In addition to the effects (1) to (4) and (6) described in the first embodiment, the present embodiment makes it possible to produce the following effect.

(7) In the method for manufacturing a honeycomb structure of the present embodiment, when forming an adhesive layer, the sealing material for a honeycomb structure described in the first embodiment is applied to side faces of each of the honeycomb fired bodies. Since, the above-mentioned sealing material for a honeycomb structure tends not to cause a decrease in the flowability and an increase in the viscosity of the paste even a long time after preparation of the paste, it may become easier to improve the operability upon applying the adhesive to the side faces of each honeycomb fired body.

Third Embodiment

The following description will discuss a third embodiment that is a still other embodiment of the present invention.

In the present embodiment, although the composition of the sealing material for a honeycomb structure is the same as that of the first embodiment and the shape of the honeycomb structure is virtually the same as that of the first embodiment, honeycomb fired bodies having a different shape from that of the first embodiment are used and different methods for forming an adhesive layer and a peripheral sealing material layer from those of the first embodiment are used in the method for manufacturing a honeycomb structure.

Figure 10:
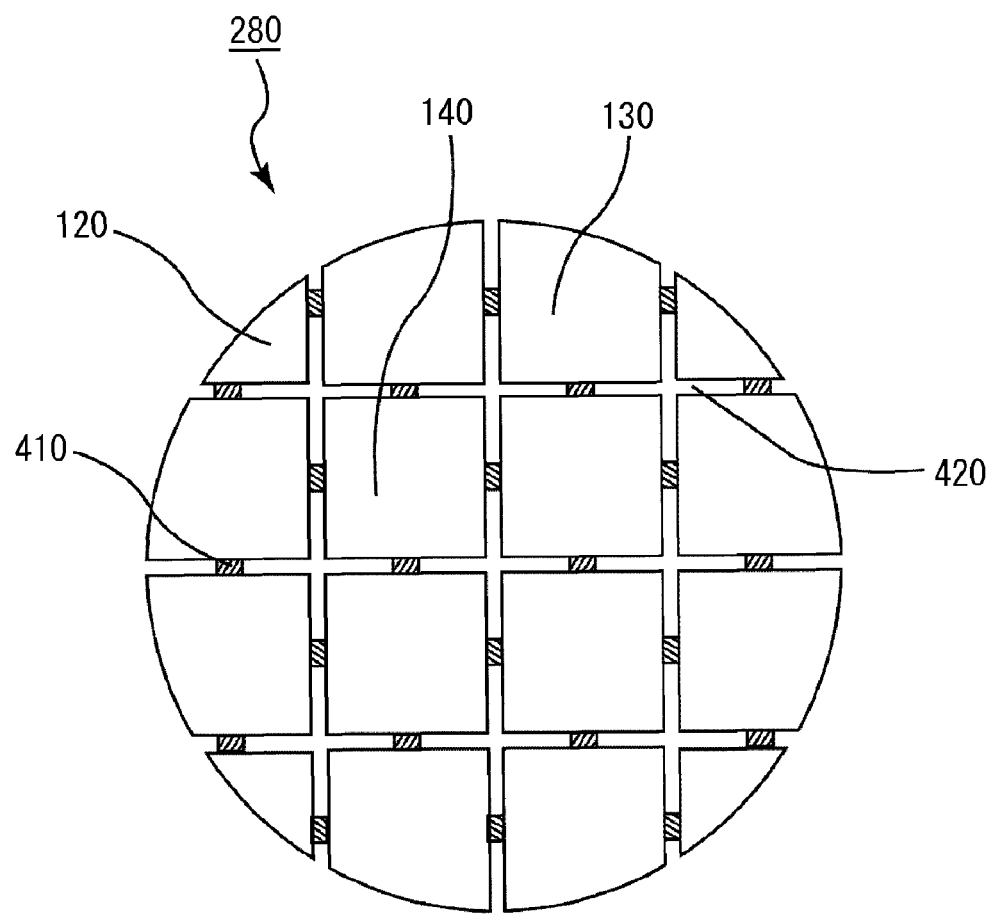
FIG. 10 is a cross-sectional view that schematically shows a cross-section of another example of a parallel-arranged body of honeycomb fired bodies according to one embodiment of the present invention, obtained by cutting in a direction perpendicular to the longitudinal direction thereof.

FIG. 10 is a cross-sectional view that schematically shows a cross-section of another example of a parallel-arranged body of honeycomb fired bodies according to one embodiment of the present invention, obtained by cutting in a direction perpendicular to the longitudinal direction thereof.

In the method for manufacturing a honeycomb structure of the present embodiment, three kinds of honeycomb fired bodies 120, 130 and 140 each having a different shape in the cross-section perpendicular to the longitudinal direction thereof are manufactured. The cross-section of each honeycomb fired body 120 has a shape surrounded by two straight lines and one curve, the cross-section of each honeycomb fired body 130 has a shape surrounded by three straight lines and one curve, and the cross-section of each honeycomb fired body 140 has a shape surrounded by four straight lines.

These honeycomb fired bodies having mutually different cross-sectional shapes can be manufactured by altering the shape of a die to be used for extrusion-molding.

Thereafter, these three kinds of honeycomb fired bodies 120, 130 and 140 are placed in parallel with one another in columns and rows, with a spacer 410 interposed therebetween to form a parallel-arranged body 280 of honeycomb fired bodies having a virtually round shape in its cross-section perpendicular to the longitudinal direction.

At this time, a gap 420 having a thickness of the spacer, is formed between the respective honeycomb fired bodies.

Successively, the parallel-arranged body of honeycomb fired bodies is placed in a filling device having a cylindrical tubiform, and a gap formed between the honeycomb fired bodies and a gap formed between the honeycomb fired bodies and the tubiform were filled with a sealing material for a honeycomb structure.

Figure 11:
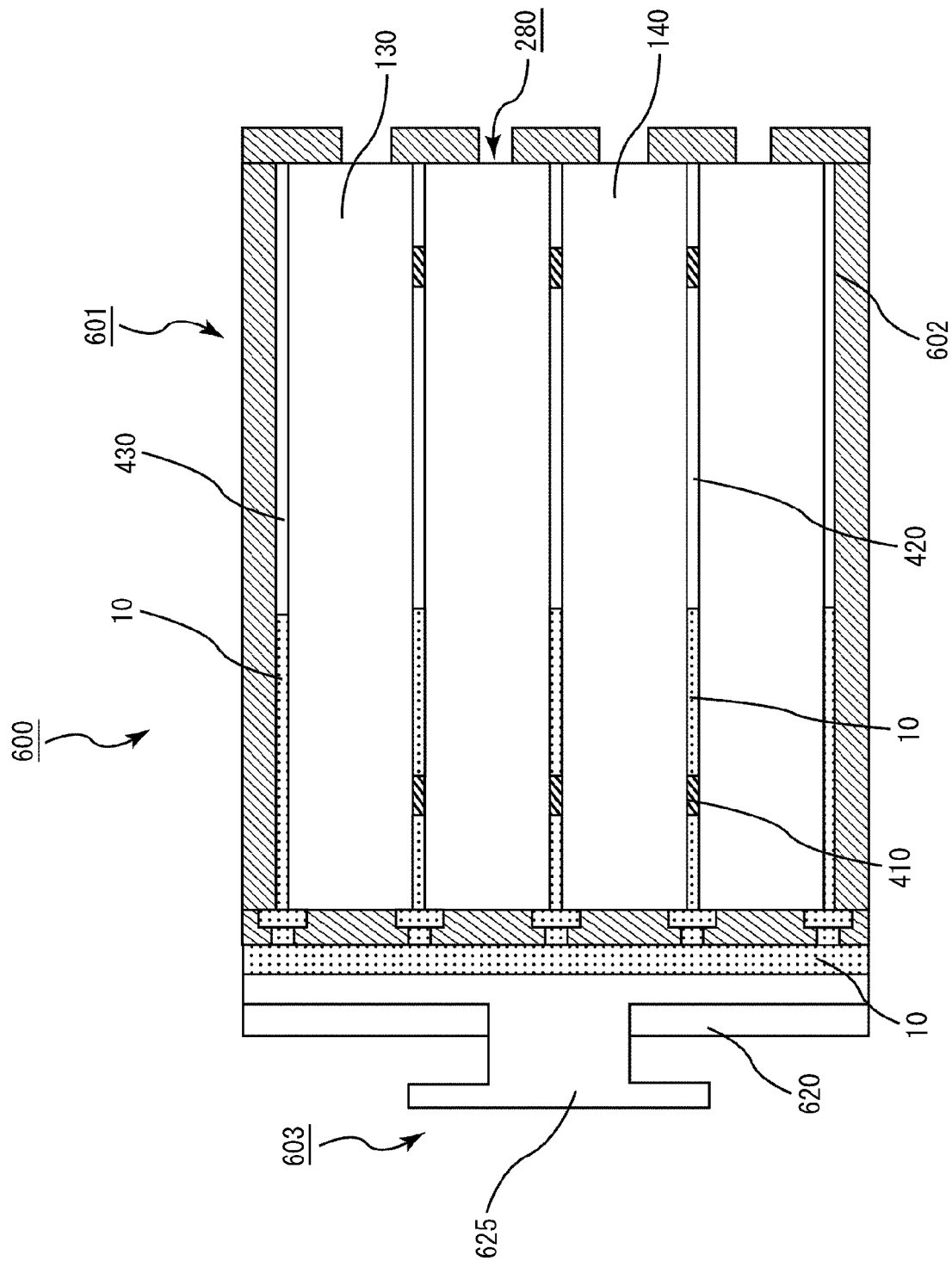
FIG. 11 is a cross-sectional view that schematically shows a cross-section obtained by cutting another example of a filling apparatus and a parallel-arranged body of honeycomb fired bodies according to one embodiment of the present invention placed in an inner space, in a direction parallel to the longitudinal direction of the parallel-arranged body of the honeycomb fired bodies.

FIG. 11 is a cross-sectional view that schematically shows a cross-section obtained by cutting another example of a filling apparatus and a parallel-arranged body of honeycomb fired bodies according to one embodiment of the present invention placed in an inner space, in a direction parallel to the longitudinal direction of the parallel-arranged body of the honeycomb fired bodies.

FIG. 11 shows the cross-section taken to include the honeycomb fired body 130 and the honeycomb fired body 140.

A filling device 600 used in the present embodiment is provided with a cylindrical tubiform 601 and a paste supply device 603. The tubiform 601 has a slightly larger inner diameter than the diameter of the parallel-arranged body 280 of honeycomb fired bodies to be placed therein. Therefore, when the parallel-arranged body 280 of honeycomb fired bodies is placed in the inner space 602 of the tubiform 601, a gap 430 is formed between the tubiform 601 and the parallel-arranged body 280 of honeycomb structures.

The paste supply device 603 and the extrusion mechanism 625 are designed to be virtually the same as the paste supply device 503 and the extrusion mechanism 525 shown in FIG. 4, and configured so that the gap 420 between the honeycomb fired bodies and the gap 430 between the tubiform 601 and the parallel-arranged body 280 of the honeycomb fired bodies are simultaneously filled with the sealing material 10 for a honeycomb structure housed in the paste chamber 620.

In the method for manufacturing a honeycomb structure of the present embodiment, by using the parallel-arranged body of honeycomb fired bodies and the filling device that have been described above, the gap between the honeycomb fired bodies and the gap between the parallel-arranged body of honeycomb fired bodies and the tubiform are filled with the sealing material for a honeycomb structure. Next, the sealing material for a honeycomb structure is dried and solidified so that the adhesive layer between the honeycomb fired bodies, and thus the peripheral sealing material layer are simultaneously formed.

In addition to the effects (1) to (4) described in the first embodiment, the present embodiment makes it possible to produce the following effect.

(8) In the method for manufacturing a honeycomb structure of the present embodiment, when forming the adhesive layer and the peripheral sealing material layer, the gap between the honeycomb fired bodies and the gap between the honeycomb fired bodies and the tubiform are filled with the sealing material for a honeycomb structure described in the first embodiment. Since the sealing material for a honeycomb structure tends not to cause a decrease in the flowability and an increase in the viscosity of the paste even a long time after preparation of the paste, it may become easier to simultaneously and easily form the adhesive layer between the honeycomb fired bodies and the peripheral sealing material layer.

Fourth Embodiment

The following description will discuss a fourth embodiment that is a still other embodiment of the present invention.

In the present embodiment, although the composition of the sealing material for a honeycomb structure is the same as that of the first embodiment, the shape of the honeycomb structure and the method for manufacturing a honeycomb structure are different from those of the first embodiment.

Figure 12:
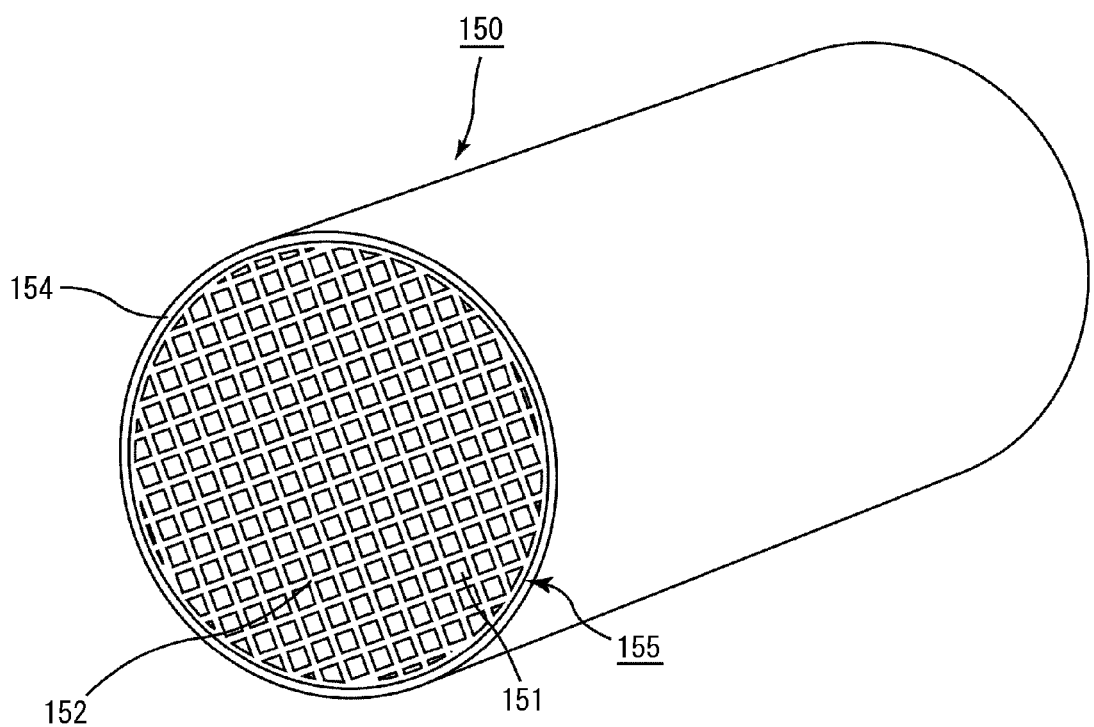
FIG. 12 is a perspective view that schematically shows another example of the honeycomb structure according to one embodiment of the present invention.

FIG. 12 is a perspective view that schematically shows another example of the honeycomb structure according to one embodiment of the present invention.

A honeycomb structure 150 shown in FIG. 12 includes a ceramic block 155 including a single piece of a pillar-shaped honeycomb fired body in which a large number of cells 151 are longitudinally placed in parallel with one another with a cell wall 152 therebetween, and a peripheral sealing material layer 154 is formed on the periphery of the ceramic block 155.

In the method for manufacturing a honeycomb structure of the present embodiment, honeycomb fired bodies are manufactured by following the same procedure as in the first embodiment, except that a honeycomb molded body having a virtually cylindrical shape is formed by altering the shape of a die used for extrusion-molding.

This honeycomb fired body is allowed to form a ceramic block without the combining process.

Thereafter, a peripheral sealing material layer forming process in which a peripheral sealing material layer is formed on the peripheral face of the ceramic block by using the sealing material for a honeycomb structure of the first embodiment is carried out.

In the peripheral sealing material layer forming process, the same method as that of the first embodiment in which the sealing material for a honeycomb structure is applied to the peripheral face of the ceramic block by using a squeegee may be used, or the same method as that of the third embodiment in which the gap formed between the peripheral face of the ceramic block and the tubiform is filled with the sealing material for a honeycomb structure by using a filling apparatus, may be used.

In addition to the effects (1) to (4) explained in the first embodiment, the present embodiment also makes it possible to produce the following effect.

(9) In the method for manufacturing a honeycomb structure of the present embodiment, when carrying out the peripheral sealing layer forming process, the sealing material for a honeycomb structure described in the first embodiment is formed on the peripheral face of the ceramic block including a single piece of the honeycomb fired body.

Since the sealing material for a honeycomb structure of the present embodiment tends not to cause a decrease in the flowability and an increase in the viscosity of the paste even a long time after preparation of the paste, it may become easier to improve the operability upon forming the peripheral sealing material paste layer on the peripheral face of the ceramic block in the peripheral sealing material layer forming process.

Other Embodiments

In the honeycomb structure according to the embodiments of the present invention, the sealing material for a honeycomb structure used to form the adhesive layer and the sealing material used to form the peripheral sealing material layer may include the same materials or different materials.

Moreover, as the adhesive, other than the sealing material for a honeycomb structure according to the embodiments of the present invention, an adhesive paste that has been conventionally used for manufacturing a honeycomb structure may be used.

Although not particularly limited, the shape of the honeycomb fired bodies is preferably designed to easily combine the honeycomb fired bodies with one another when forming a honeycomb structure. For example, a square, rectangular, hexagonal, sector shape or the like may be used as its cross-sectional shape.

The shape of the honeycomb structure according to the embodiments of the present invention is not particularly limited to a round pillar-shape, and may be a desired pillar shape such as a cylindroid shape and a polygonal pillar shape.

The porosity of the honeycomb fired body is not particularly limited, and desirably at least about 35% and at most about 60%.

When the honeycomb structure is used as a filter, the porosity of about 35% or more tends not to cause clogging in the honeycomb structure. In contrast, the porosity of about 60% or less tends not to cause a reduction in the strength of the honeycomb fired body, resulting in less possible breakage.

The average pore diameter of the honeycomb fired body is desirably at least about 5 μm and at most about 30 μm.

When the honeycomb structure is used as a filter, the average pore diameter of about 5 μm or more tends not to cause clogging due to particulates. In contrast, the average pore diameter of about 30 μm or less tends not to cause particulates to easily pass through the pores. As a result, the honeycomb fired body is more likely to capture the particulates, which enables functioning as a filter.

Here, the porosity and the average pore diameter can be measured through conventionally known methods such as a mercury porosimetry, Archimedes method, and a measuring method using a scanning electronic microscope (SEM).

The cell density in the cross-section perpendicular to the longitudinal direction of the honeycomb fired body is not particularly limited. However, a desirable lower limit thereof is about 31.0 pcs/cm$^2$ (about 200 pcs/inch$^2$) and a desirable upper limit is about 93.0 pcs/cm$^2$ (about 600 pcs/inch$^2$). A more desirable lower limit is about 38.8 pcs/cm$^2$ (about 250 pcs/inch 2) and a more desirable upper limit is about 77.5 pcs/cm$^2$ (about 500 pcs/inch$^2$)

Further, the thickness of the cell walls of the honeycomb fired body is not particularly limited, and desirably at least about 0.1 mm and at most about 0.4 mm.

The main component of constituent materials of the honeycomb fired body is not limited to silicon carbide. Examples of other ceramic materials may include ceramic powders, for example, nitride ceramics such as aluminum nitride, silicon nitride, boron nitride and titanium nitride; carbide ceramics such as zirconium carbide, titanium carbide, tantalum carbide and tungsten carbide; oxide ceramics such as alumina, zirconia, cordierite, mullite, and aluminum titanate; and the like.

Among these components, non-oxide ceramics are preferable, and silicon carbide is more preferable because this is excellent in thermal resistance properties, mechanical strength, thermal conductivity and the like. Moreover, examples of the constituent material of the honeycomb fired body also include silicon-containing ceramics, in which metallic silicon is blended with the above-described ceramics, as well as a ceramic material such as ceramic bound by silicon or silicate compounds. And among these, those ceramics (silicon-containing silicon carbide) in which metallic silicon is blended with silicon carbide are desirably used.

Especially, a silicon-containing silicon carbide ceramic containing about 60% by weight or more of silicon carbide is desirable.

The particle diameter of the ceramic powder is not particularly limited, and the ceramic powder that tends not to cause the case where the size of the honeycomb fired body manufactured by the following firing treatment becomes smaller than that of the honeycomb molded body after degreased is preferable.

The organic binder used when forming the wet mixture is not particularly limited, and examples thereof include methylcellulose, carboxymethylcellulose, hydroxyethylcellulose, polyethylene glycol, and the like. Methylcellulose is desirable among these. A blending amount of the organic binder is desirably at least about 1 parts by weight and at most about 10 parts by weight with respect to 100 parts by weight of ceramic powder.

The plasticizer used when forming the wet mixture is not particularly limited, and examples thereof include glycerin and the like. The lubricant is not particularly limited, and examples thereof include polyoxyalkylene-based compounds such as polyoxyethylene alkyl ether and polyoxypropylene alkyl ether, and the like.

Specific examples of the lubricant include polyoxyethylene monobutyl ether, polyoxypropylene monobutyl ether, and the like.

Moreover, the plasticizer and the lubricant may not be contained in the wet mixture in some cases.

In addition, a dispersant solution may be used upon preparing a wet mixture, and examples of the dispersant solution include water, an organic solvent such as benzene, alcohol such as methanol, and the like.

Furthermore, a molding auxiliary may be added to the wet mixture.

The molding auxiliary is not particularly limited, and examples thereof include ethylene glycol, dextrin, fatty acid, fatty acid soap, polyalcohol and the like.

Furthermore, a pore-forming agent such as balloons that are fine hollow spheres including oxide-based ceramics, spherical acrylic particles, graphite and the like may be added to the wet mixture, if necessary.

The balloon is not particularly limited, and examples thereof include alumina balloon, glass micro balloon, shirasu balloon, fly ash balloon (FA balloon), mullite balloon and the like. Alumina balloon is desirable among these.

The plug material paste for sealing the cells is not particularly limited, a plug to be manufactured through the subsequent processes desirably has a porosity of at most about 30% and at least about 75%, and for example, it is possible to use a plug material paste having the same composition as that of the wet mixture of the raw material.

The catalyst to convert and/or purify exhaust gases may be supported on the honeycomb structure according to the embodiments of the present invention, and desirable examples of the catalyst to be supported include noble metals such as platinum, palladium and rhodium. Platinum is more desirable among these. Moreover, an alkali metal such as potassium and sodium, and an alkali earth metal such as barium may be used as other catalysts. These catalysts may be used alone, or two or more kinds of these may be used in combination.

In the above, as the honeycomb structure according to the embodiments of the present invention, the honeycomb structure (honeycomb filter) in which either one end portion of each of the cells is sealed is described. However, the honeycomb structure according to the embodiments of the present invention need not have an end portion of each cell sealed. Such a honeycomb structure may be desirably used as a catalyst supporting carrier.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A method for manufacturing a honeycomb structure including a ceramic block, the method comprising:
   preparing a sealing material comprising:
   mixing inorganic fibers including at least one of an alkali metal compound, an alkaline earth metal compound and a boron compound, inorganic particles, and an organic binder to prepare a mixture;
   adding an alkaline oxide sol as oxide sol to the mixture to prepare an alkaline mixture; and
   mixing an acidic solution with the alkaline mixture, said acidic solution comprising at least one of sulfuric acid, phosphoric acid, lactic acid, acetic acid, and formic acid, wherein said sealing material has a pH of at least about 4 and at most about 6;
   providing a periphery sealing material paste layer including said sealing material on a peripheral face of the ceramic block; and
   drying and solidifying said sealing material to provide a peripheral sealing material layer.

2. The method for manufacturing a honeycomb structure according to claim 1, wherein the peripheral face of the ceramic block is coated with the sealing material to provide the peripheral sealing material paste layer.

3. The method for manufacturing a honeycomb structure according to claim 1, further comprising:
   applying an adhesive to side faces of a plurality of honeycomb fired bodies;
   laminating the plurality of honeycomb fired bodies interposing the adhesive between the honeycomb fired bodies; and
   drying and solidifying the adhesive to form an adhesive layer which bonds the plurality of honeycomb fired bodies.

4. The method for manufacturing a honeycomb structure according to claim 3,
   wherein
   the sealing material is used as the adhesive.

5. The method for manufacturing a honeycomb structure according to claim 1, further comprising:
   arranging a plurality of honeycomb fired bodies with a gap between the honeycomb fired bodies;
   placing the arranged plurality of honeycomb fired bodies in a frame to have a peripheral gap between the honeycomb fired bodies and the frame;
   filling with the sealing material the gap formed between said honeycomb fired bodies and the peripheral gap formed between said honeycomb fired bodies and the frame; and
   drying and solidifying the sealing material to form an adhesive layer between the honeycomb fired bodies and the peripheral sealing material layer.

6. The method for manufacturing a honeycomb structure according to claim 1,
   wherein
   a pH of said acidic solution is at least about 1 and at most about 3.

7. The method for manufacturing a honeycomb structure according to claim 1,
wherein
the acidic solution comprises a lactic acid aqueous solution.

8. The method for manufacturing a honeycomb structure according to claim 1,
wherein
an average particle diameter of said oxide sol is at least about 5 nm and at most about 30 nm.

9. The method for manufacturing a honeycomb structure according to claim 1,
wherein
said oxide sol comprises at least one of silica sol, alumina sol and zirconia sol.

10. The method for manufacturing a honeycomb structure according to claim 9,
wherein
said oxide sol is consisted of silica sol.

11. The method for manufacturing a honeycomb structure according to claim 1,
wherein
a pH of said alkaline oxide sol is at least about 8.5 and at most about 10.5.

12. The method for manufacturing a honeycomb structure according to claim 1,
wherein
said inorganic fibers further include silica.

13. The method for manufacturing a honeycomb structure according to claim 12,
wherein
a content of said silica is at least about 60% by weight and at most about 85% by weight.

14. The method for manufacturing a honeycomb structure according to claim 1,
wherein
said alkali metal compound includes at least one of sodium oxide and potassium oxide,
said alkaline earth metal compound includes at least one of magnesium oxide, calcium oxide and barium oxide, and
said boron compound includes boron oxide.

15. The method for manufacturing a honeycomb structure according to claim 1,
wherein
a content of said inorganic fibers is at least about 10% by weight and at most about 70% by weight as solids content.

16. The method for manufacturing a honeycomb structure according to claim 1,
wherein
a fiber length of said inorganic fibers is at least about 0.1 μm and at most about 1000 μm.

17. The method for manufacturing a honeycomb structure according to claim 1,
wherein
a content of said oxide sol is at least about 1% by weight and at most about 30% by weight as solids content.

18. The method for manufacturing a honeycomb structure according to claim 1,
wherein
said inorganic particles include at least one of carbides and nitrides.

19. The method for manufacturing a honeycomb structure according to claim 18,
wherein
said inorganic particles comprise at least one of silicon carbide, silicon nitride and boron nitride.

20. The method for manufacturing a honeycomb structure according to claim 1,
wherein
a content of said inorganic particles is at least about 3% by weight and at most about 80% by weight as solids content.

21. The method for manufacturing a honeycomb structure according to claim 1,
wherein
the honeycomb fired body comprises at least one of silicon carbide and silicon-containing silicon carbide.

22. The method for manufacturing a honeycomb structure according to claim 1, further comprising
providing a catalyst on the honeycomb structure.

23. The method for manufacturing a honeycomb structure according to claim 1, further comprising
sealing either one end portion of each of said cells.

24. The method for manufacturing a honeycomb structure according to claim 1, further comprising:
arranging a plurality of honeycomb fired bodies with a gap between the honeycomb fired bodies;
filling the gap with an adhesive; and
drying and solidifying the adhesive to form an adhesive layer which bonds the plurality of honeycomb fired bodies.

25. The method for manufacturing a honeycomb structure according to claim 24,
wherein
the sealing material is used as the adhesive.

26. The method for manufacturing a honeycomb structure according to claim 1,
wherein
the inorganic fibers include one of silica, alumina, and the alkaline earth metal compound, the alkaline earth metal compound including at least one of MgO, CaO, and BaO.

27. The method for manufacturing a honeycomb structure according to claim 1,
wherein
the inorganic fibers have a solubility of about 0.03% or more in a physiological saline solution at about 37° C.

28. The method for manufacturing a honeycomb structure according to claim 1,
wherein
the inorganic fibers include one of a combination of silica and the alkaline earth metal compound, and a combination of alumina and the alkaline earth metal compound, the alkaline earth metal compound including at least one of MgO, CaO, and BaO.

29. The method for manufacturing a honeycomb structure according to claim 1,
wherein
the inorganic fibers include silica, alumina, and the alkaline earth metal compound, the alkaline earth metal compound including at least one of MgO, CaO, and BaO.

30. The method for manufacturing a honeycomb structure according to claim 1,
wherein
the alkaline oxide sol comprises an alkaline silica sol.

31. The method for manufacturing a honeycomb structure according to claim 1,
wherein
the acidic solution comprises at least one of phosphoric acid, lactic acid, and acetic acid.

32. The method for manufacturing a honeycomb structure according to claim 1,
wherein
the acidic solution comprises lactic acid.

* * * * *